United States Patent
Kurihara et al.

(10) Patent No.: US 9,430,271 B2
(45) Date of Patent: Aug. 30, 2016

(54) DATA PROCESSING SYSTEM AND SCHEDULING METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP); Hiromasa Yamauchi, Usakos (NA); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 14/164,933

(22) Filed: Jan. 27, 2014

(65) Prior Publication Data

US 2014/0143790 A1 May 22, 2014

Related U.S. Application Data

(63) Continuation of application No. PCT/JP2011/067134, filed on Jul. 27, 2011.

(51) Int. Cl.
*G06F 9/46* (2006.01)
*G06F 9/48* (2006.01)
*G06F 9/50* (2006.01)

(52) U.S. Cl.
CPC ............... *G06F 9/46* (2013.01); *G06F 9/4881* (2013.01); *G06F 9/5083* (2013.01); *G06F 2209/483* (2013.01)

(58) Field of Classification Search
CPC .............................. G06F 9/4881; G06F 9/505
USPC .......................... 718/102, 103, 105
See application file for complete search history.

(56) References Cited

U.S. PATENT DOCUMENTS

| 2003/0236815 | A1 | 12/2003 | Brenner et al. | |
|---|---|---|---|---|
| 2007/0150759 | A1* | 6/2007 | Srinivasan | G06F 1/3203 713/300 |
| 2010/0242041 | A1* | 9/2010 | Plondke | G06F 9/3851 718/103 |
| 2012/0131584 | A1* | 5/2012 | Raevsky | G06F 8/45 718/102 |
| 2012/0192194 | A1* | 7/2012 | Richardson | G06F 9/526 718/103 |

FOREIGN PATENT DOCUMENTS

| JP | 9-282188 | 10/1997 |
|---|---|---|
| JP | 2001-331461 | 11/2001 |
| JP | 2004-30663 | 1/2004 |
| JP | 2006-243864 | 9/2006 |

OTHER PUBLICATIONS

PCT International Preliminary Report on Patentability mailed Feb. 6, 2014 in corresponding International Application No. PCT/JP2011/067134.
International Search Report mailed Dec. 6, 2011 in corresponding International Patent Application No. PCT/JP2011/067134.

* cited by examiner

*Primary Examiner* — Andy Ho
(74) *Attorney, Agent, or Firm* — Staas & Halsey LLP

(57) ABSTRACT

A data processing system includes an interrupt controller that counts, as an interrupt processing execution count, executions of interrupt processing by threads executed by data processing devices; and a processor that is configured to select one scheduling method from among a plurality of scheduling methods, based on the interrupt processing execution count.

2 Claims, 17 Drawing Sheets

INTERRUPT COUNT TABLE 403

| | THREAD ID | INTER-RUPT COUNT | INTERRUPT PROCESSING TIME [ms] | LOAD [ms] |
|---|---|---|---|---|
| 403-1 | 0-0 | 5 | 1 | 2 |
| 403-2 | 0-1 | 0 | 0 | 4 |
| 403-3 | 0-2 | 7 | 1.2 | 4 |
| 403-4 | 1-0 | 6 | 0.8 | 4 |
| 403-5 | 1-1 | 5 | 0.9 | 4 |
| 403-6 | 1-2 | 1 | 1 | 6 |
| 403-7 | 2-0 | 0 | 0 | 4 |
| 403-8 | 3-0 | 0 | 0 | 6 |
| | ... | ... | ... | ... |

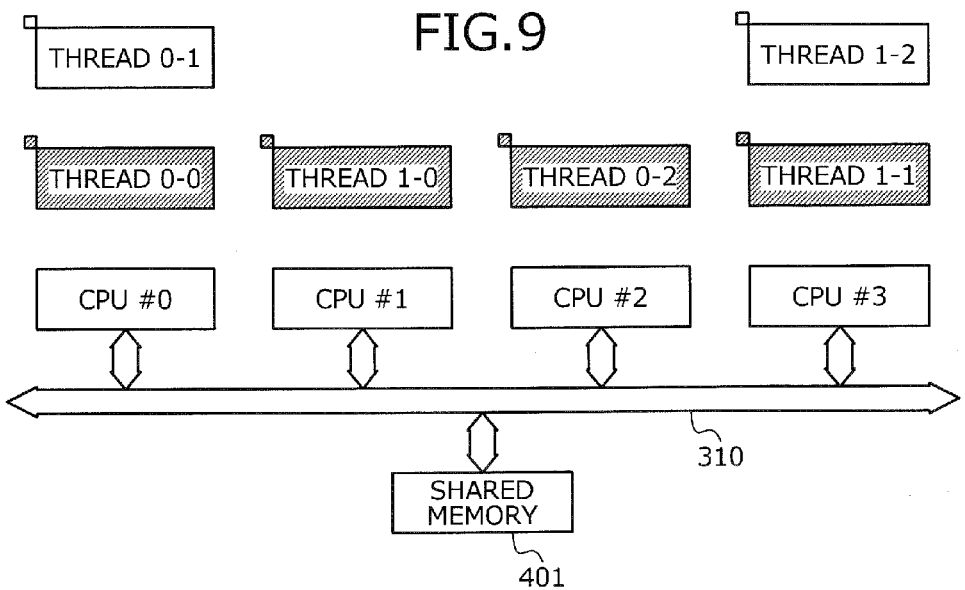
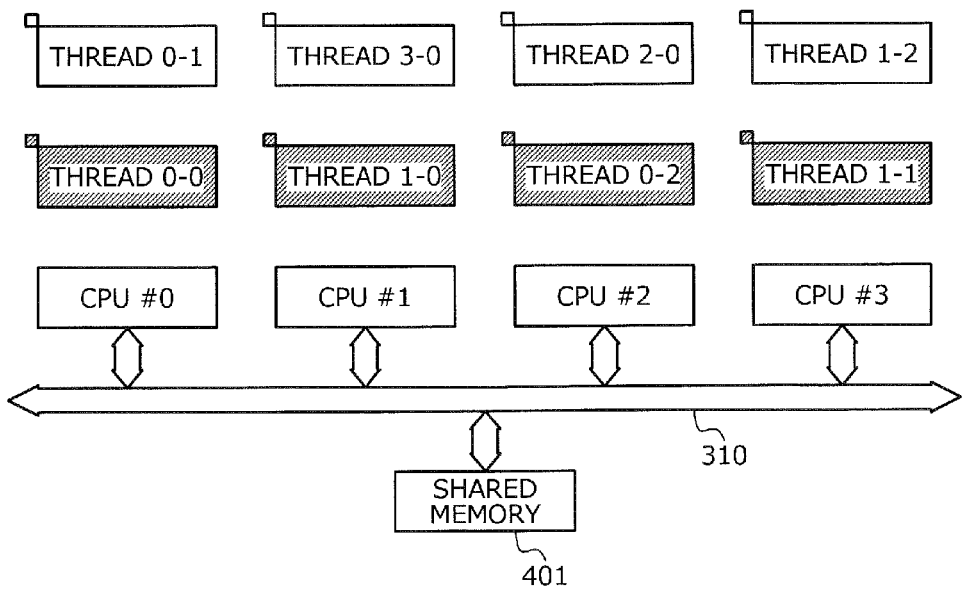

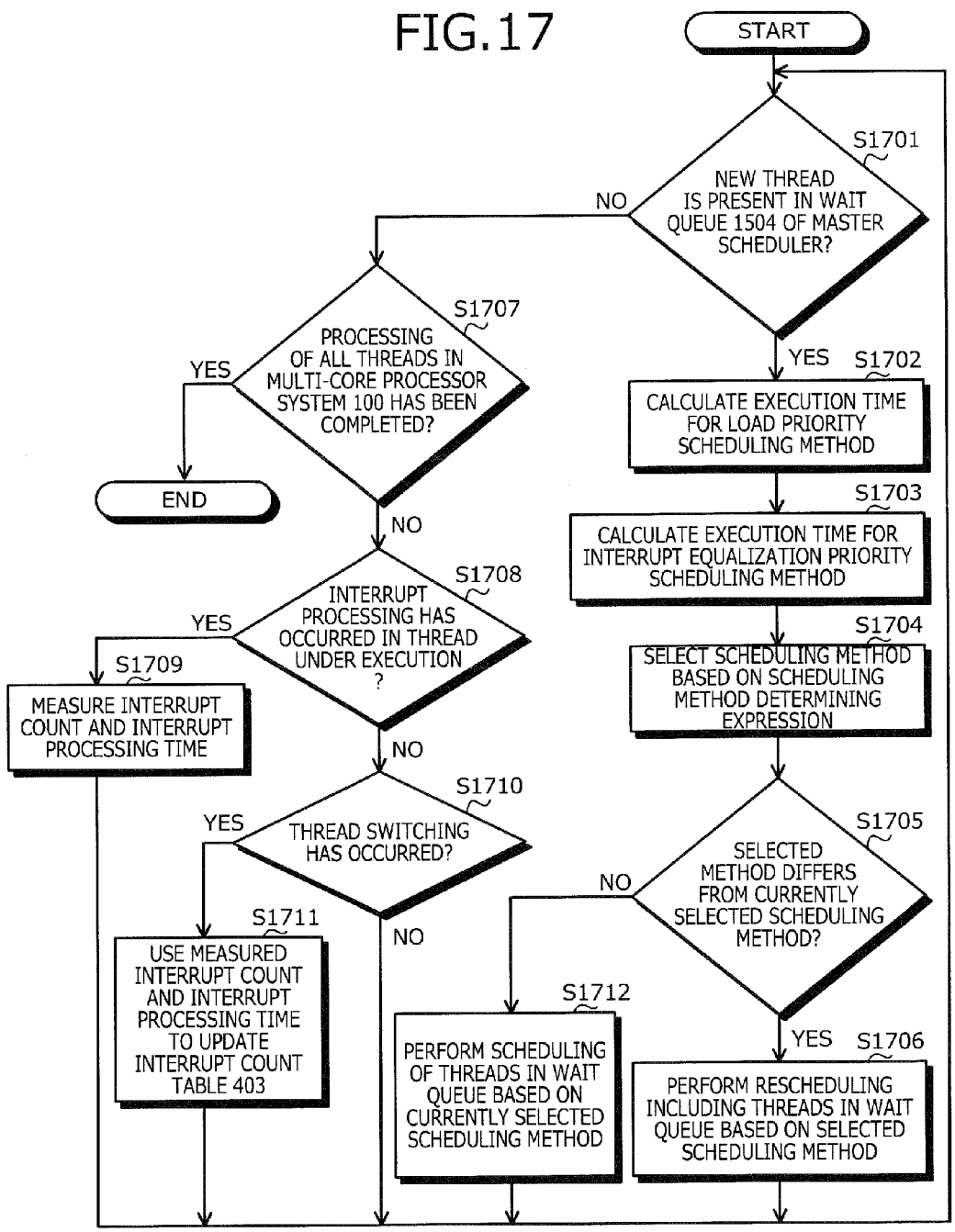

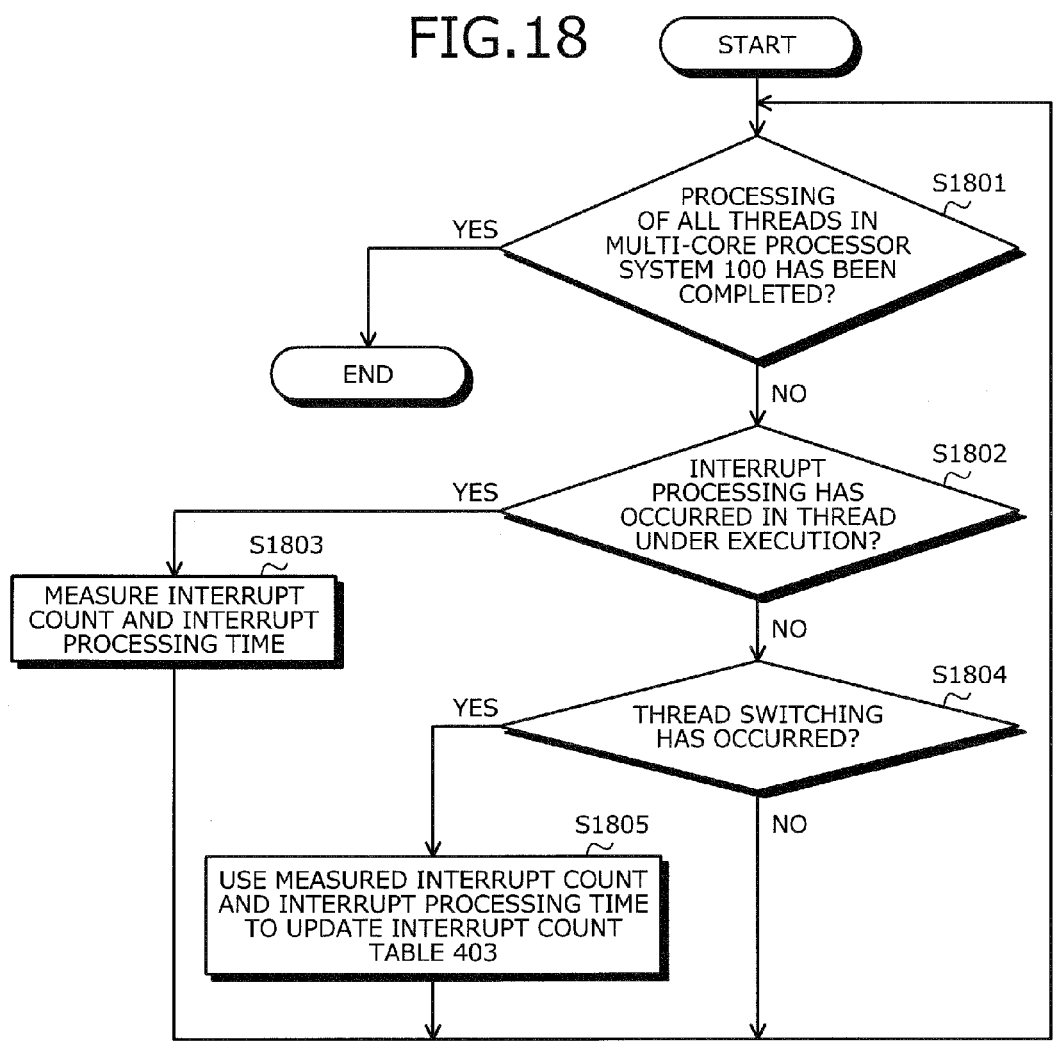

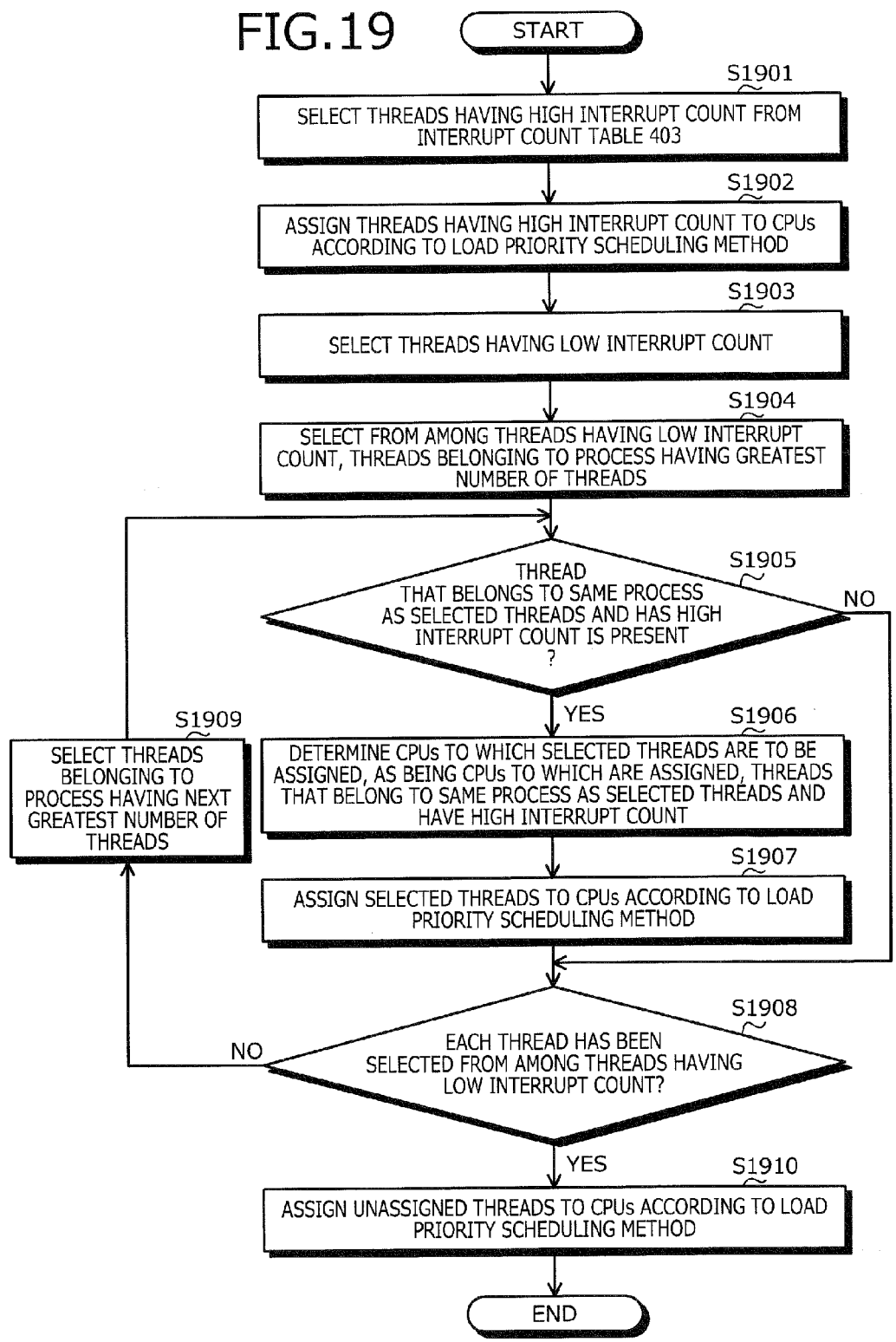

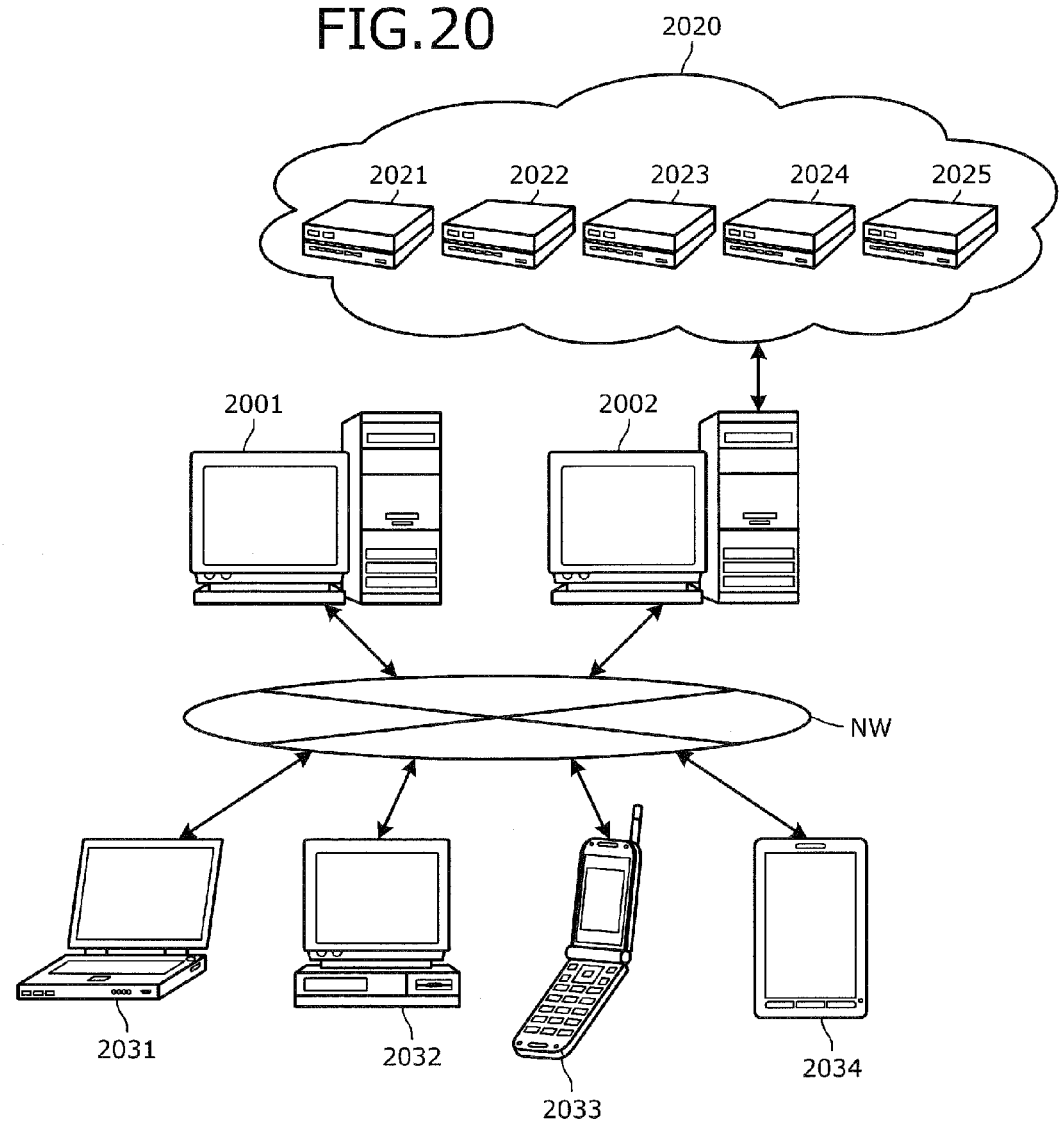

DATA PROCESSING SYSTEM AND SCHEDULING METHOD

CROSS REFERENCE TO RELATED APPLICATIONS

This application is a continuation application of International Application PCT/JP2011/067134, filed on Jul. 27, 2011 and designating the U.S., the entire contents of which are incorporated herein by reference.

FIELD

The embodiments discussed herein are related to a data processing system and a scheduling method that assign threads.

BACKGROUND

In recent years, an increasing number of apparatuses employ, in place of a single-core processor system that is a computer equipped with a single central processing unit (CPU), a multi-core processor system that is a computer equipped with plural CPUs. The multi-core processor system assigns plural threads to the plural CPUs in parallel to achieve high-speed data processing. A program is executed in units of threads. As a scheduling method for deciding to which CPU a thread is to be assigned, there exists a technique that performs scheduling such that loads on the CPUs become even.

A conventional technique exists that, in a computer system, saves a thread currently under execution by a CPU in response to an interrupt signal from a device and executes interrupt processing for the interrupt signal. This enables the computer system to improve its response speed to the interrupt signal from the device.

As a technique relevant to a scheduling method taking the interrupt processing into consideration, there is disclosed, for example, a technique that decides a CPU whose thread under execution has a lower priority to be a CPU for performing the interrupt processing. A technique is also disclosed in which a CPU with a lowest interrupt load executes a process having a higher priority (see, e.g., Japanese Laid-Open Patent Publication Nos. 2004-30663, 2006-243864, H9-282188, and 2001-331461).

However, the above conventional techniques encounter a problem that when assigning threads to CPUs such that thread loads become even, thread processing may be delayed in a CPU to which a lot of frequently interrupted threads are assigned. For example, when a thread is executed, a CPU runs in a user mode that is one of execution modes, whereas when interrupt processing is executed, the CPU runs in a kernel mode, so that the thread processing time does not include the interrupt processing time that is processing time for the interrupt processing. Accordingly, there arises a problem that in the CPU to which a lot of frequently interrupted threads are assigned, the thread processing becomes hard to progress and may be delayed depending on the status of execution, leading to a delay in the overall processing.

SUMMARY

According to an aspect of an embodiment, a data processing system includes an interrupt controller that counts, as an interrupt processing execution count, executions of interrupt processing by threads executed by data processing devices; and a processor that is configured to select one scheduling method from among plural scheduling methods, based on the interrupt processing execution count.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is an explanatory view (2) of the example of the thread assignment method according to the interrupt equalization priority scheduling method;

FIG. 10 is an explanatory view (3) of the example of the thread assignment method according to the interrupt equalization priority scheduling method;

FIG. 17 is a flowchart of an example of a scheduling method switching procedure performed by a master OS;

FIG. 18 is a flowchart of an example of a scheduling method switching procedure performed by a slave OS;

FIG. 19 is a flowchart of an example of an assigning procedure according to the interrupt equalization priority scheduling method; and FIG. 20 is an explanatory view of an example of application to a system that uses a computer according to the embodiment.

DESCRIPTION OF EMBODIMENTS

Embodiments of a data processing system and a scheduling method will be described in detail with reference to the accompanying drawings. In the data processing system, a multi-core processor is a processor that is equipped with plural cores, and may be provided as a single processor equipped with plural cores or a group of single-core processors arranged in parallel. In the present embodiment, for the sake of simplicity, description will be given taking a group of parallel, single-core processors as an example.

Figure 1:
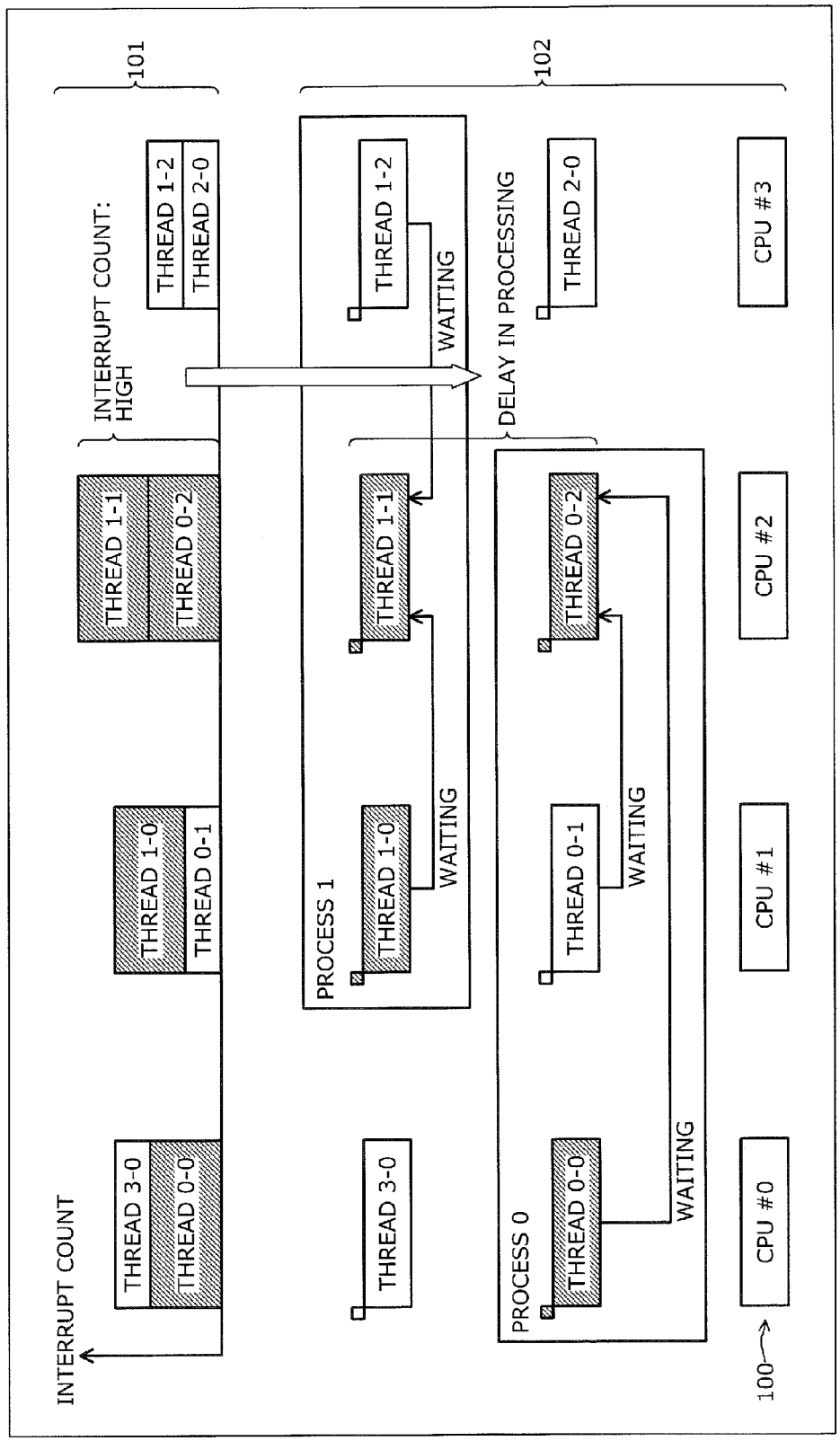
FIG. 1 is an explanatory view of operations performed when a multi-core processor system 100 assigns threads according to a load priority scheduling method.

FIG. 1 is an explanatory view of operations performed when a multi-core processor system 100 assigns threads according to a load priority scheduling method. In the multi-core processor system 100 having plural CPUs depicted in FIG. 1, the threads are assigned to the CPUs such that loads on the CPUs become even. A graph 101 depicts an interrupt count for each thread. The multi-core processor system 100 designated at reference numeral 102 presents a thread assignment state obtained when threads are assigned according to the load priority scheduling method.

Threads currently under execution in the multi-core processor system 100 of FIG. 1 are threads 0-0, 0-1, 0-2, 1-0, 1-1, 1-2, 2-0, and 3-0. Among these threads, the threads 0-0 to 0-2 belong to a process 0 and the threads 1-0 to 1-2 belong to a process 1. Management in an operating system (OS) is performed in units of processes and plural threads can belong to a single process. Threads belonging to the same process can share computer resources such as memory managed by the OS. For the simplicity of description, all thread loads are assumed to be the same in FIG. 1.

A CPU #0 is executing the threads 0-0 and 3-0, a CPU #1 is executing the threads 0-1 and 1-0, a CPU #2 is executing the threads 0-2 and 1-1, and a CPU #3 is executing the threads 2-0 and 1-2. The threads 0-0, 0-2, 1-0, and 1-1 are threads that undergo frequent interrupt processing. A thread undergoing frequent interrupt processing is for example a thread that accesses hardware resources. When an interrupt signal is issued from hardware, an interrupt controller receives the interrupt signal and notifies a CPU of the reception the interrupt signal. The CPU executes interrupt processing corresponding to the interrupt signal.

The graph 101 is a graph of the magnitude of the interrupt count in each CPU when threads are assigned to the CPUs according to the load priority scheduling method. The graph 101 indicates that the CPU #2, to which two threads having a high interrupt count are assigned, most frequently execute the interrupt processing. The interrupt count is obtained by counting up the number of times interrupt processing is executed by the interrupt controller. For example, upon each receipt of an interrupt signal, the interrupt controller regards the interrupt processing as having been executed by the CPU and increments the count. The CPU acquires the count when switching a thread to another thread, thereby acquiring the interrupt count on a thread-by-thread basis.

The CPU #2 having a high interrupt count delays in the processing of the threads 1-1 and 0-2. At this time, if the threads 0-0 and 0-1 belonging to the same process as the thread 0-2 wait for the processing of the thread 0-2, the processing of the threads 0-0 and 0-1 stops resulting in a delay of the entire multi-core processor system 100. Similarly, if the threads 1-0 and 1-2 also wait for the processing of the thread 1-1, the processing of the threads 1-0 and 1-2 stops as well.

Figure 2:
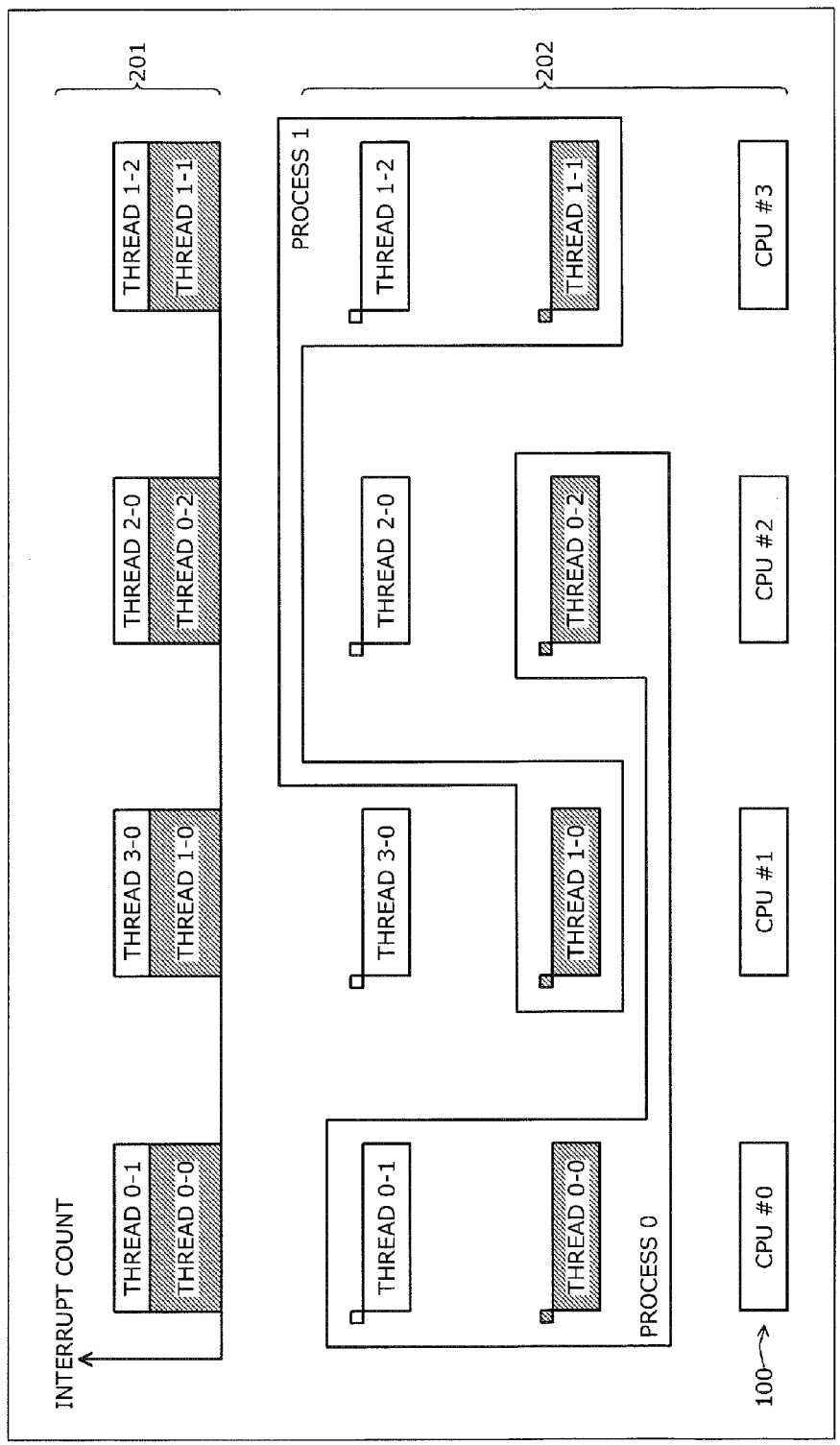
FIG. 2 is an explanatory view of operations performed when the multi-core processor system 100 assigns threads according to an interrupt equalization priority scheduling method.

FIG. 2 is an explanatory view of operations performed when the multi-core processor system 100 assigns threads according to an interrupt equalization priority scheduling method. When assigned according to the interrupt equalization priority scheduling method, the threads are assigned to the CPUs such that the thread execution times including the interrupt processing time become leveled. A graph 201 depicts the interrupt count of each thread. The multi-core processor system 100 designated at reference numeral 202 presents a thread assignment state obtained when threads are assigned according to the interrupt equalization priority scheduling method. The relationships between the threads and process in FIG. 2 are similar to those of FIG. 1 and therefore, will not again be described.

In FIG. 2, the CPU #0 is executing the threads 0-0 and 0-1, the CPU #1 is executing the threads 1-0 and 3-0, the CPU #2 is executing the threads 0-2 and 2-0, and the CPU #3 is executing the threads 1-1 and 1-2. In this manner, the multi-core processor system 100 assigns threads having a high interrupt processing count to the CPUs #0 to #3 in a distributed manner, to thereby equalize the interrupt counts in the CPUs #0 to #3.

The graph 201 is a graph depicting the magnitude of the interrupt count at each CPU when threads are assigned to the CPUs according to the interrupt equalization priority scheduling method. The graph 201 shows that the interrupt counts in the CPUs become equalized.

In the case of different thread loads, thread assignment using the load priority scheduling method may ensure a higher efficiency. Accordingly, the multi-core processor system 100 selects a scheduling method among the load priority scheduling method and the interrupt equalization priority scheduling method, based on the execution time predicted from the interrupt processing count. Thus, the multi-core processor system 100 can improve the processing speed of the entire system by selecting one more efficient scheduling method according to the execution status.

Figure 3:
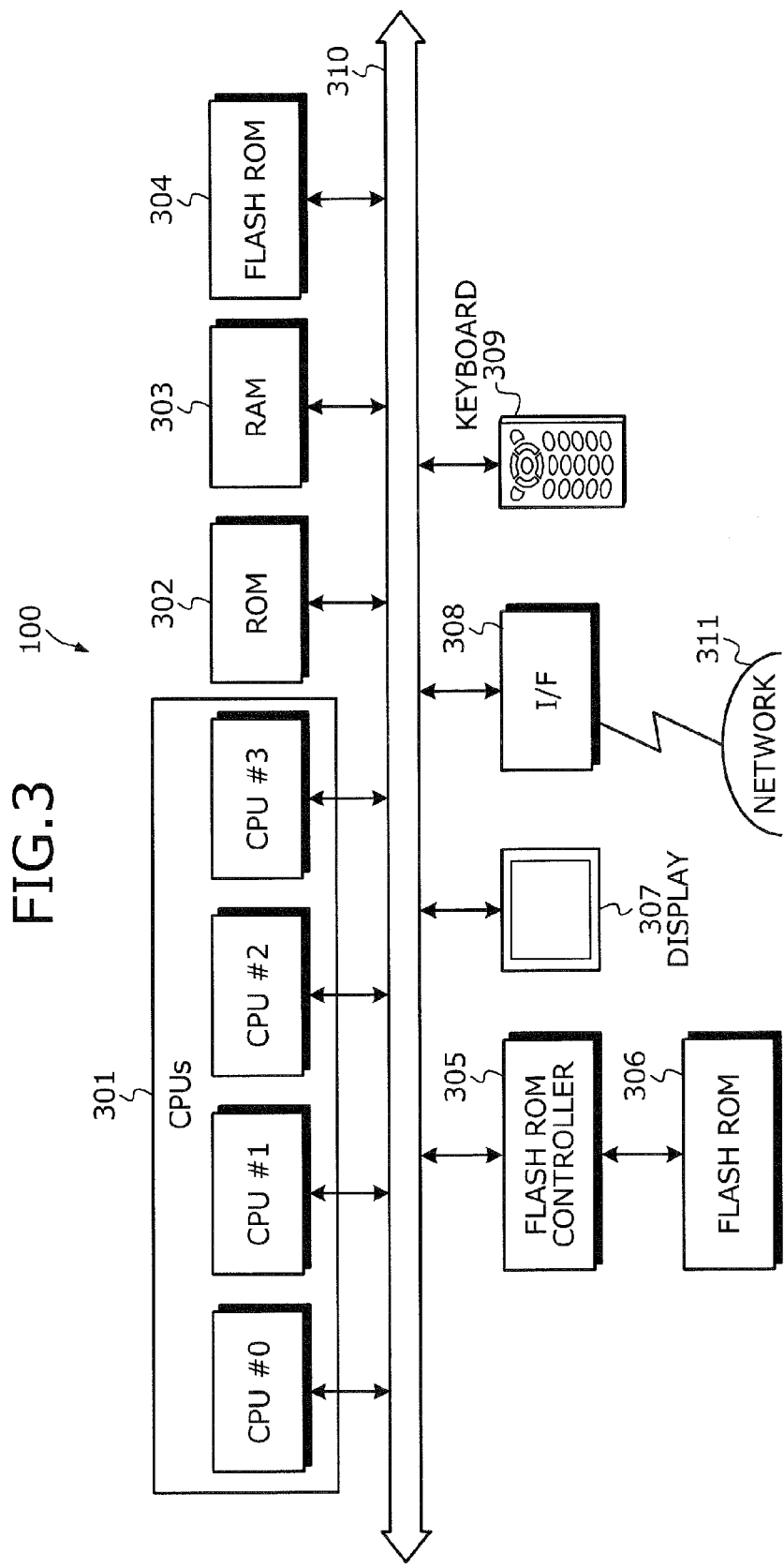
FIG. 3 is a block diagram of a hardware configuration of the multi-core processor system 100.

FIG. 3 is a block diagram of a hardware configuration of the multi-core processor system 100. As depicted in FIG. 3, the multi-core processor system 100 includes central processing units (CPUs) 301, read-only memory (ROM) 302, random access memory (RAM) 303, flash ROM 304, a flash ROM controller 305, flash ROM 306, a display 307 as an input/output device for the user and other devices, an interface I/F 308, and a keyboard 309, respectively connected by a bus 310.

The CPUs 301 govern overall control of the multi-core processor system 100. The CPUs 301 include the CPUs #0 to #3. The CPUs 301 may have dedicated cache memory. The multi-core processor system 100 may be a multi-core processor system that includes plural cores. Further, the multi-core processor system 100 is a system of computers that include processors equipped with plural cores. As long as the cores are provided in plural, the cores may be provided as a single processor equipped with plural processors or as a group of single-core processors in parallel. In the present embodiment, description will be given using CPUs that are single-core processors and provided in parallel as an example.

The ROM 302 is non-volatile memory that stores programs such a boot program. The RAM 303 is volatile memory used as a work area of the CPUs 301. The flash ROM 304 enables high speed reading, such as NOR type flash ROM. The flash ROM 304 stores system software such as an operating system (OS), and application software. For example, when the OS is updated, the multi-core processor system 100 receives a new OS via the I/F 308 and updates the old OS that is stored in the flash ROM 304 with the received new OS.

The flash ROM controller 305, under the control of the CPUs 301, controls the reading and writing of data with respect to the flash ROM 306. The flash ROM 306 is flash ROM that stores data, has a primary purpose of portability, and may be, for example, NAND type flash ROM. The flash ROM 306 stores therein data written under control of the flash ROM controller 305. Examples of the data include image data and video data acquired by the user of the multi-core processor system through the I/F 308, as well as a program that executes the thread processing method according to the present embodiment. A memory card, SD card and the like may be adopted as the flash ROM 306.

The display 307 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 307.

The I/F 308 is connected to a network 211 such as a local area network (LAN), a wide area network (WAN), and the Internet through a communication line and is connected to other apparatuses through the network 311. The I/F 308 administers an internal interface with the network 311 and controls the input and output of data with respect to external apparatuses. For example, a modem or a LAN adaptor may be employed as the I/F 308.

The keyboard 309 includes, for example, keys for inputting letters, numerals, and various instructions and performs the input of data. Alternatively, a touch-panel-type input pad or numeric keypad, etc. may be adopted.

Figure 4:
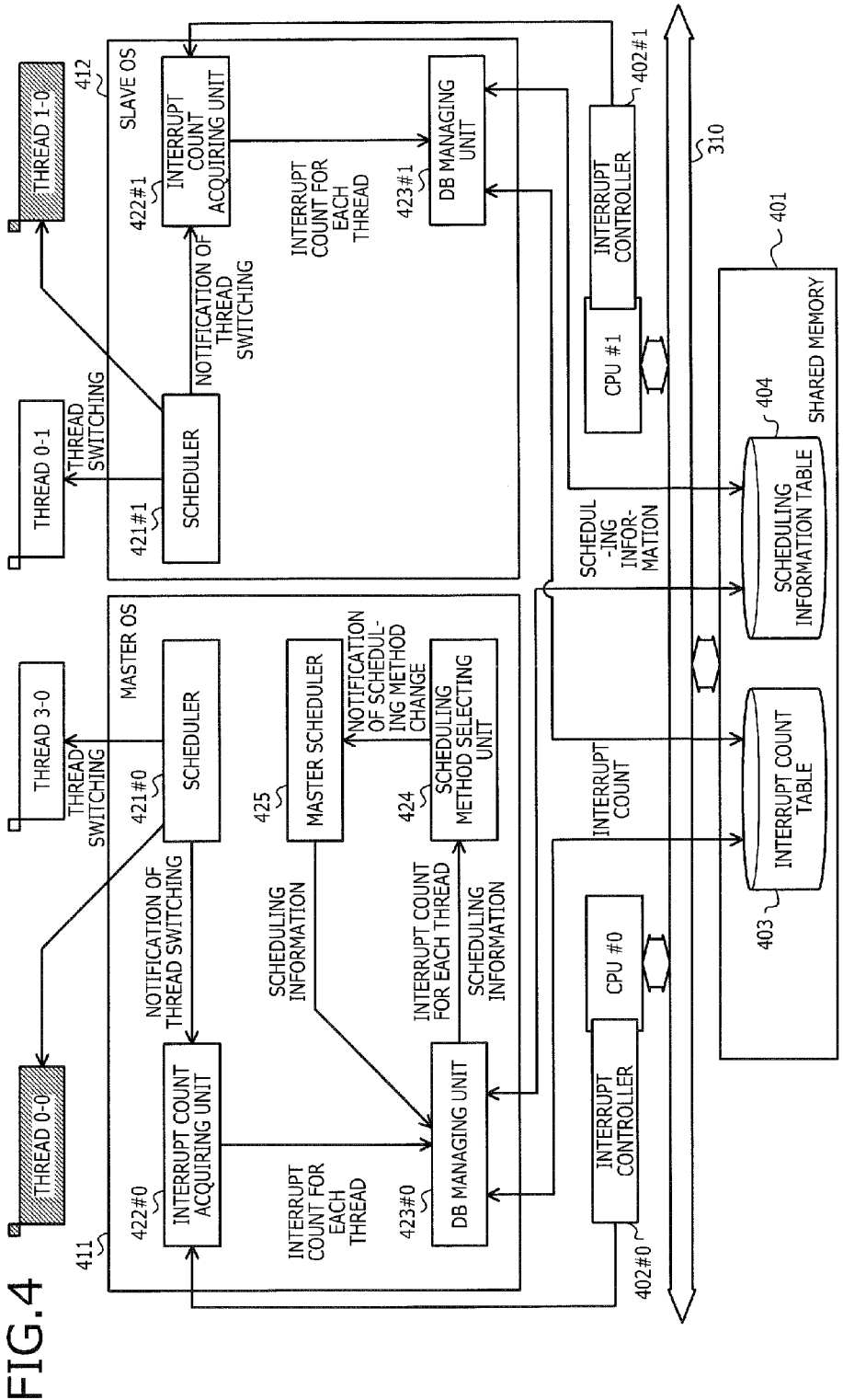
FIG. 4 is a block diagram of a software example of the multi-core processor system 100.

FIG. 4 is a block diagram of a software example of the multi-core processor system 100. The multi-core processor system 100 depicted in FIG. 4 includes CPUs #0 and #1 and a shared memory 401. The CPUs #0 and #1 are communicable with interrupt controllers 402#0 and 402#1, respectively. The CPU #0 is executing the threads 0-0 and 3-0 and the CPU #1 is executing the threads 0-1 and 1-0.

The shared memory 401 is a storage area accessible by the CPUs 301. The storage area includes for example the RAM 303 and the flash ROMs 304 and 306. The shared memory 401 has an interrupt count table 403 and a scheduling information table 404. The interrupt count table 403 is a table that stores interrupt counts according to thread. The details of the interrupt count table 403 will be described later with reference to FIG. 6. The scheduling information table 404 is a table that stores scheduling information. The scheduling information is information concerning threads assigned to the CPUs. A specific example of the scheduling information is information that the thread 0-0 is assigned to the CPU #0. The details of the scheduling information table 404 will be described later with reference to FIG. 7.

The interrupt controller 402#0 receives an interrupt signal from a device such as the flash ROM controller 305, the display 307, the I/F 308, and the keyboard 309 and notifies the CPU #0 of the reception thereof. Similarly, the interrupt controller 402#1 receives an interrupt signal from the device and notifies the CPU #1 of the reception thereof. The interrupt controllers 402 record the count of interrupt signals from the device. The recorded information is stored for example in an internal status register, etc., of the interrupt controllers 402.

The interrupt is classified into two types, i.e., a hardware interrupt based on an interrupt signal from a device and a software interrupt caused by an internal factor of a CPU. Also when interrupt processing occurs due to a software interrupt, the CPU may store the interrupt processing count into, for example, the register, the RAM 303, etc. of the CPU.

Software running in the multi-core processor system 100 will be described. The CPU #0 runs a master OS 411, while the CPU #1 runs a slave OS 412. The master OS 411 includes a scheduler 421#0, an interrupt count acquiring unit 422#0, a DB managing unit 423#0, a scheduling method selecting unit 424, and a master scheduler 425. The slave OS 412 includes a scheduler 421#1, an interrupt count acquiring unit 422#1, and a DB managing unit 423#1. The scheduler 421#1 to the DB managing unit 423#1 are functions included in both the master OS 411 and the slave OS 412.

The schedulers 421 have a function of controlling the assignment of threads. For example, the schedulers 421 decide a thread that is to be assigned to a CPU, next, after the elapse of time previously decided by time slice and assign the decided thread to the CPU. For example, if the time slice is 2 [ms], the scheduler 421#0 switches the thread between the threads 0-0 and 3-0 every time 2 [ms] elapses. When a thread switching occurs, the schedulers 421 notify the interrupt count acquiring units 422 of the occurrence of the thread switching.

The schedulers 421 are set so that when interrupt processing occurs, a CPU runs an interrupt handler corresponding to the interrupt processing. After the completion of the interrupt processing, the schedulers 421 acquire the interrupt processing time consumed for the interrupt processing. The schedulers 421 update the interrupt processing time whenever executing interrupt processing. As an example of an updating method, the schedulers 421 again store a value obtained by averaging the interrupt processing time stored in a storage area such as the register and the RAM 303 and most-recently acquired interrupt processing time, into the storage area. At the time of a thread switching, the schedulers 421 notify the interrupt count acquiring units 422 of the interrupt processing time stored in the storage area.

When notified of the thread switching, the interrupt count acquiring units 422 acquire the interrupt counts for each thread. For example, when switched from the thread 0-0 to the thread 3-0, the interrupt count acquiring unit 422-0 acquires the interrupt count stored in the internal status register, etc., of the interrupt controller 402#0 as being the interrupt count of the thread 0-0 that is a pre-switching thread. If there exists a software interrupt caused by an internal factor of a CPU, the interrupt count acquiring units 422 may acquire the interrupt count together with the software interrupt count. In this case, the interrupt count acquiring units 422 sum up the hardware interrupt count and the software interrupt count to set the sum as being a pre-switching thread interrupt count. After the acquisition, the interrupt count acquiring units 422 notify the DB managing units 423 of the pre-switching thread interrupt count and of the interrupt processing time notified together at the time of the thread switching.

The DB managing units 423 have a function of updating the interrupt count table 403 based on the notified thread interrupt count and interrupt processing time. As an example of an updating method, the DB managing units 423 may store the notified value as is into the interrupt count table 403 or may average a value on the interrupt count table 403 and the notified value to store the average into the interrupt count table 403.

The DB managing unit 423#0 on the master OS 411 has a function of updating the scheduling information table 404 by using scheduling information notified from the master scheduler 425. For example, the DB managing unit 423#0 stores into the scheduling information table 404, scheduling information that a new thread is assigned to the CPU #0.

When receiving a reference request for the interrupt count and interrupt processing time, for each thread, and scheduling information from the scheduling method selecting unit 424, the DB managing unit 423#0 acquires the corresponding information from the interrupt count table 403 and the scheduling information table 404.

The scheduling method selecting unit 424 has a function of selecting any one among the load priority scheduling method and the interrupt equalization priority scheduling method based on the interrupt count and interrupt processing time, for each thread, and the scheduling information obtained from the DB managing unit 423. An example of a selecting method will be described later with reference to FIG. 5. The scheduling method selecting unit 424 notifies the master scheduler 425 of the selected scheduling method.

The master scheduler 425 has a function of performing scheduling for threads currently under execution in the multi-core processor system 100, according to the scheduling method selected between the load priority scheduling method and the interrupt equalization priority scheduling method. For example, if the load priority scheduling method is selected, the master scheduler 425 performs the scheduling so that the loads on the CPUs become even, based on loads of the threads. If the interrupt equalization priority scheduling method is selected, the master scheduler 425 performs the scheduling so that the thread execution times including the interrupt processing times become even. The details of the interrupt equalization priority scheduling method will be described later with reference to FIGS. 8 to 10.

Figures 5, 6:
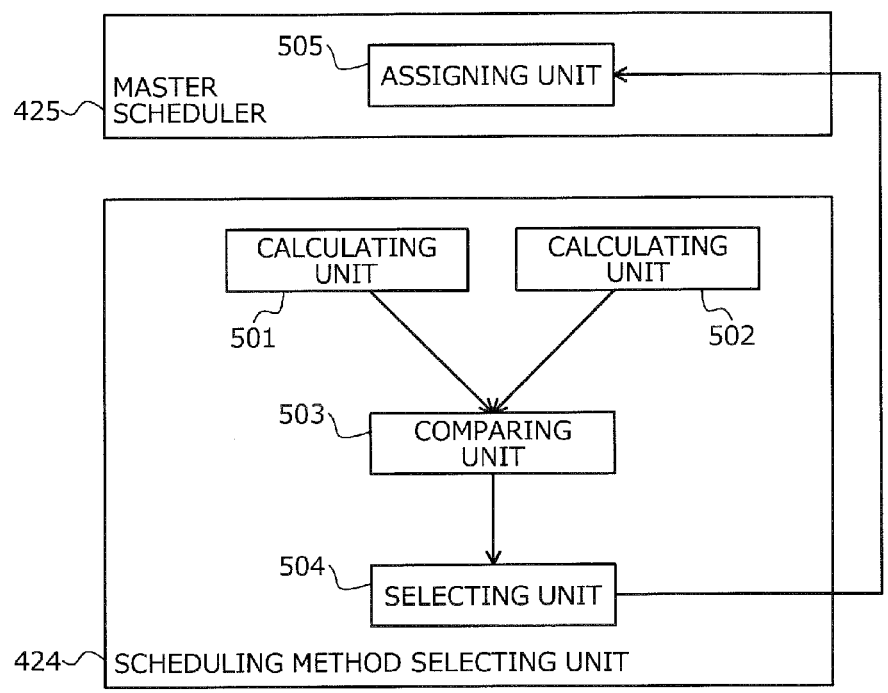
FIG. 5 is block diagram of functions of a scheduling method selecting unit 424 and a master scheduler 425.
FIG. 6 is an explanatory view of an example of storage contents of an interrupt count table 403.

Functions of the scheduling method selecting unit 424 and the master scheduler 425 will be described. FIG. 5 is block diagram of functions of the scheduling method selecting unit 424 and the master scheduler 425. The scheduling method selecting unit 424 includes calculating units 501 and 502, a comparing unit 503, and a selecting unit 504. The master scheduler 425 includes an assigning unit 505. The functions (the calculating 501 to the assigning unit 505) providing the control unit are implemented by the CPU #0 executing a program stored in the storage device. The storage device is for example the ROM 302, the RAM 303, the flash ROMs 304 and 306, etc.

The calculating unit 501 has a function of calculating a first execution period that would be consumed if first tasks are scheduled by a first scheduling method. The first tasks are threads currently under execution in the multi-core processor system 100 and the first scheduling method is the load priority scheduling method. Although a task refers to a thread, a task may refer to part of the thread. When assigning new tasks to plural data processing devices, the calculating unit 501 may calculate the first execution period when second tasks that include new tasks and the first tasks are scheduled by the first scheduling method.

The calculating unit 501 may calculate the first execution period as being the largest sum of the interrupt processing time consumed for interrupt processing occurring during the execution of a process assigned to a CPU and the load of the process, among such sums for each CPU. The load of a process is represented by the time consumed to complete the process. Accordingly, as the processing amount increases, the time consumed for completing the process becomes longer, resulting in an increasing amount of load. The load and the interrupt processing time are stored in the interrupt count table 403. For example, the load may be the time consumed to complete processing of a thread or may be the time consumed to complete processing of part of a thread. The processing of part of a thread is, for example, processing up to a specific synchronous point.

The threads 0-0 and 3-0 are assumed to be assigned to the CPU #0 and the threads 0-1 and 1-0 are assumed to be assigned to the CPU #1, for example. Further, the loads of the threads 0-0, 0-1, 1-0, and 3-0 are assumed to be 2 [ms], 4 [ms], 4 [ms], and 6 [ms], respectively. The interrupt processing time consumed for the interrupt processing is assumed to be 5 [ms], 0 [ms], 4.8 [ms], and 0 [sc], respectively. At this time, the calculating unit 501 calculates the first execution period as being 13 [ms] since the sums for the CPUs #0 and #1 are (2+5)+(6+0)=7+6=13 and (4+0)+(4+4.8)=4+8.8=12.8, respectively.

The calculating unit 501 may determine the total time using Equation 1, which will be described later. The calculated first execution period is stored to a storage area such as a general purpose register of the CPU #0, the RAM 303, and the flash ROMs 304 and 306.

The calculating unit 502 has a function of calculating a second execution period that would be consumed if the first tasks are scheduled by a second scheduling method different from the first scheduling method. The second scheduling method is the interrupt equalization priority scheduling method. The calculating unit 502 calculates the second execution period when the second tasks are scheduled by the second scheduling method. Since the calculating unit 502 corresponds to a state where the first scheduling method is substituted by the second scheduling method in the description of the calculating unit 501, the calculating unit 502 will not again be described. The calculated second execution period is stored to a storage area such as a general purpose register of the CPU #0, the RAM 303, and the flash ROMs 304 and 306.

The comparing unit 503 has a function of comparing the first execution period and the second execution period. The comparing unit 503 may compare the execution time corresponding to the current scheduling method with the sum of the execution time corresponding to the other scheduling method execution and the time consumed for the process assignment. For example, the current scheduling method is assumed to be the load priority scheduling method and the first execution period is assumed to be 12.8 [ms] with the second execution period corresponding to the interrupt equalization priority scheduling method being 12.4 [ms]. Further, the time consumed for the process assignment is assumed to be 0.3 [ms]. At this time, the comparing unit 503 compares 12.8 [ms] and 12.4+0.3 [ms]. The result of comparison is stored into the storage area such as the general purpose register of the CPU #0, the RAM 303, and the flash ROMs 304 and 306.

The selecting unit 504 has a function of selecting any one among the first scheduling method and the second scheduling method based on the result of comparison between the first execution period and the second execution period by the comparing unit 503, to assign the second tasks to the data processing devices. For example, if the result of comparison indicates that the second execution period is less than the first execution period, the selecting unit 504 selects the second scheduling method. The selecting unit 504 may select the scheduling method based on the result of comparison between the execution time corresponding to the current scheduling method and the sum of the execution time corresponding to the other scheduling method and the time consumed for the process assignment. The result of comparison is stored to a storage area such as a general purpose register of the CPU #0, the RAM 303, and the flash ROMs 304 and 306.

The assigning unit 505 has a function of assigning tasks to the data processing devices according to the scheduling method selected by the selecting unit 504. For example, if the second scheduling method is selected by the selecting unit 504, the assigning unit 505 assigns threads to the CPUs according to the second scheduling method.

If the second scheduling method is selected, the assigning unit 505 assigns to the second data processing devices, a task that experiences the interrupt processing at a first frequency among the second tasks. The assigning unit 505 then assigns a task that experiences the interrupt processing at a second frequency among the second tasks, to a data processing device among plural data processing devices to which tasks are assigned that belong to the same process to which the task belongs. The first frequency is higher than the second frequency. The frequency of the interrupt processing is given as the interrupt count per unit time. For example, the assigning unit 505 assigns a thread subjected to high-frequency interrupt processing to the CPUs #0 to #3. The assigning unit 505 then assigns a low-frequency thread to a CPU to which is assigned a thread belonging to the same process.

After the assignment of the task during which the interrupt processing occurs at the second frequency, the assigning unit 505 assigns unassigned tasks among the second tasks to the data processing devices such that loads on the data processing devices become even. For example, the assigning unit 505 assigns unassigned threads with low-frequency interrupt processing to the CPUs #0 to #3 such that loads on the CPUs #0 to #3 become even. Information of assignment to the CPUs decided by the assigning unit 505 is stored as scheduling information into the scheduling information table 404.

FIG. 6 is an explanatory view of an example of storage contents of the interrupt count table 403. The interrupt count table 403 is a table that stores the interrupt count and the interrupt processing time, according to thread. The interrupt count table 403 depicted in FIG. 6 has eight records, i.e., records 403-1 to 403-8 entered therein. The interrupt count table 403 includes four fields, i.e., a thread ID field, an interrupt count field, an interrupt processing time field, and a load field.

The thread ID field stores identification information with which a thread is uniquely identifiable. Identification information employed is for example a value uniquely numbered by the multi-core processor system 100, a pointer to a thread context, etc. For the simplicity of description, the interrupt count table 403 depicted in this embodiment stores, as identification information, reference numerals imparted to threads. The interrupt count field stores a count of the number of times that the interrupt processing is executed during the execution of a thread. The interrupt processing time field stores average time that the interrupt processing is executed each time.

For example, taking the record 403-1 as an example, the record 403-1 shows that the load is 2 [ms], that the interrupt processing is executed 5 times during the execution of a thread 0-0, and that the average time for each interrupt processing session is 1 [ms].

As an updating method of the interrupt count table 403, the multi-core processor system 100 may initialize the interrupt count table 403 at each given period to update the interrupt count and the interrupt processing time for the given period. This enables the multi-core processor system 100 to immediately deal with a change in interrupt tendency. The multi-core processor system 100 may calculate respective averages of the interrupt count and interrupt processing time stored in the interrupt count table 403 and the interrupt count and interrupt processing time for a certain period, and store the results into the interrupt count table 403.

The developer of the scheduling method selecting unit 424 and the master scheduler 422 may differ from the developer of the threads. In this case, it is difficult for the scheduling method selecting unit 424 and the master scheduler 422 to determine which thread undergoes the interrupt at a high frequency. Accordingly, the past history is stored in a storage area as depicted in FIG. 6 so that the scheduling method selecting unit 424 and the master scheduler 425 can determine a thread that undergoes the interrupt at a high frequency.

Figure 7:
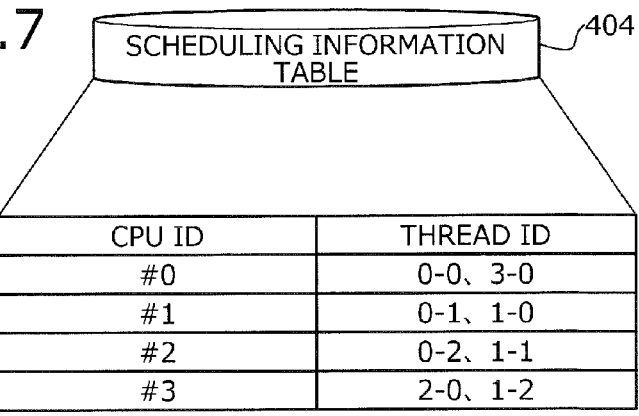
FIG. 7 is an explanatory view of an example of a scheduling information table 404.

FIG. 7 is an explanatory view of an example of the scheduling information table 404. The scheduling information table 404 is a table that stores assigned threads, according to CPU. The scheduling information table 404 depicted in FIG. 7 has four records, i.e., records 404-1 to 404-4 entered therein. The scheduling information table 404 includes two fields, i.e., a CPU ID field and a thread ID field.

The CPU ID field stores identification information with which a CPU is uniquely identifiable. The thread ID field stores identification information of threads assigned to a CPU. For example, taking the record 404-1 as an example, the record 404-1 shows that threads 0-0 and 3-0 are assigned to the CPU #0.

In the state depicted in FIG. 7, for example, the master scheduler 425 is assumed to issue scheduling information indicating that the thread 3-0 is assigned to the CPU #1. At this time, the DB managing unit 423 changes the value of the thread ID field of the record 404-1 from "0-0, 3-0" to "0-0" and changes the value of the thread ID field of the record 404-2 from "0-1, 1-0" to "0-1, 1-0, 3-0".

As a method of migrating threads between CPUs, there exists a method, for example, in which a migration source CPU saves thread context, which is information during the execution of a thread, into the shared memory 401 and a migration destination CPU reads the saved thread context.

Figure 8:
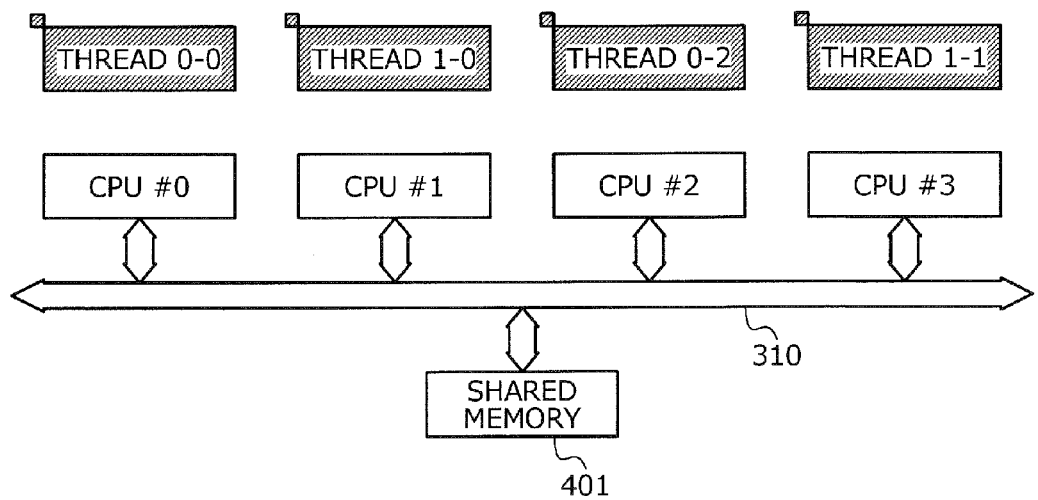
FIG. 8 is an explanatory view (1) of an example of a thread assignment method according to the interrupt equalization priority scheduling method.

With reference to FIGS. 8 to 10, description will be given of an example of the thread assignment method based on the interrupt equalization priority scheduling method. The interrupt equalization priority scheduling method is executed by the master scheduler 425.

FIG. 8 is an explanatory view (1) of an example of a thread assignment method according to the interrupt equalization priority scheduling method. First, the master scheduler 425 assigns threads in which the interrupt occurs at a high frequency to the CPUs. As a method of determining whether the interrupt occurs at a high frequency, for example, the scheduling method selecting unit 424 determines that the thread is subjected to a high-frequency interrupt if the interrupt count acquired for the thread is greater than or equal to a predetermined threshold value, and stores the result of determination into the storage area. The master scheduler 425 then acquires the threads in which the interrupt occurs at a high frequency by using the stored result of determination. The scheduling method selecting unit 424 may determine a predetermined number of threads among threads having the highest interrupt count, as being the threads subjected to the interrupt at a high frequency.

For example, when the predetermined threshold value=5 in the interrupt count table 403 depicted in FIG. 6, the scheduling method selecting unit 424 determines the threads subjected to the interrupt at a high frequency to be the threads 0-0, 0-2, 1-0, and 1-1. The master scheduler 425 assigns the high-frequency threads to the CPUs #0 to #3. As the method of assigning the high-frequency threads to the CPUs #0 to #3, the master scheduler 425 may employ the load priority scheduling method.

For example, the master scheduler 425 assigns a thread having the highest load to the CPU #0 and then assigns a thread with the second highest load to the CPU #1. At the time of the completion of assignment of threads to all the CPUs, if there unassigned threads are present among high-frequency threads, the master scheduler 425 successively assigns the unassigned threads to the CPUs in ascending order of load.

In the example of FIG. 8, the master scheduler 425 assigns the threads 0-0, 1-0, 0-2, and 1-1 to the CPUs #0, #1, #2, and #3, respectively. By first assigning the high-frequency threads as depicted in FIG. 8, the multi-core processor system 100 can prevent the threads subjected to the interrupt at a high frequency from being assigned to a single CPU in an unbalanced manner.

FIG. 9 is an explanatory view (2) of the example of the thread assignment method according to the interrupt equalization priority scheduling method. The state depicted in FIG. 9 shows the state after the assignment of the threads subjected to the interrupt at a high frequency depicted in FIG. 8. The master scheduler 425 selects from among threads subjected to the interrupt at a low frequency, threads of the process having the most number of threads. After the selection, the master scheduler 425 determines whether there threads are present that belong to the same process as the selected threads and that have a high interrupt count. If present, the master scheduler 425 assigns the selected threads to CPUs to which the threads are assigned that belong to the same process and have a high interrupt count.

For example, from among the threads 0-1, 1-2, 2-0, and 3-0 that are low-frequency threads, the master scheduler 425 selects threads of the process 0, which has the greatest number of threads. The master scheduler 425 then assigns the thread 0-1 to either the CPU #0 to which is assigned the thread 0-0, which belongs to the same process and has a high interrupt count, or the CPU #2 to which the thread 0-2 is assigned. The master scheduler 425 may employ the load priority scheduling method as the assignment method at this time.

For example, the master scheduler 425 assigns the thread 0-1 to the CPU having the lower load among the CPUs #0 and #2. The same applies to the assignment of the thread 1-2. The master scheduler 425 assigns the thread 1-2 to the CPU having the lower load among the CPUs #1 and #3. In the example of FIG. 9, the master scheduler 425 assigns the threads 0-1 and 1-2 to the CPUs #0 and #3, respectively.

As depicted in FIG. 9, by assigning threads subjected to the interrupt at a low frequency to CPUs to which high-frequency threads are assigned that belong to the same process, there is reduced the possibility for threads of other processes to be assigned to CPUs to which threads are assigned that are subjected to the interrupt at a high frequency. This can prevent threads of the other processes from experiencing the adverse effect arising from the delay in the processing caused by the threads subjected to the interrupt at a high frequency.

FIG. 10 is an explanatory view (3) of the example of the thread assignment method according to the interrupt equalization priority scheduling method. The state depicted in FIG. 10 is a state where the threads subjected to the interrupt at a low frequency depicted in FIG. 9 are assigned to CPUs to which high-frequency threads are assigned that belong to the same process. The master scheduler 425 assigns unassigned threads according to the load priority scheduling method.

For example, the master scheduler 425 assigns unassigned threads 2-0 and 3-0 according to the load priority scheduling method. In the example depicted in FIG. 10, the master scheduler 425 assigns the threads 3-0 and 2-0 to the CPUs #1 and #2, respectively Referring next to FIGS. 11 to 14, description will be given of the thread execution results obtained when the multi-core processor system 100 employs any one among the load priority scheduling method and the interrupt equalization priority scheduling method. The processing information common to FIGS. 11 to 14 is such that the time slice is 2 [ms] and that the loads of the threads are 2 [ms] for the thread 0-0, 4 [ms] for the thread 0-1, 4 [ms] for the thread 0-2, and 4 [ms] for the thread 2-0. The loads of the other threads are 6 [ms] for the thread 3-0, 4 [ms] for the thread 1-0, 4 [ms] for the thread 1-1, and 6 [ms] for the thread 1-2.

Figure 11:
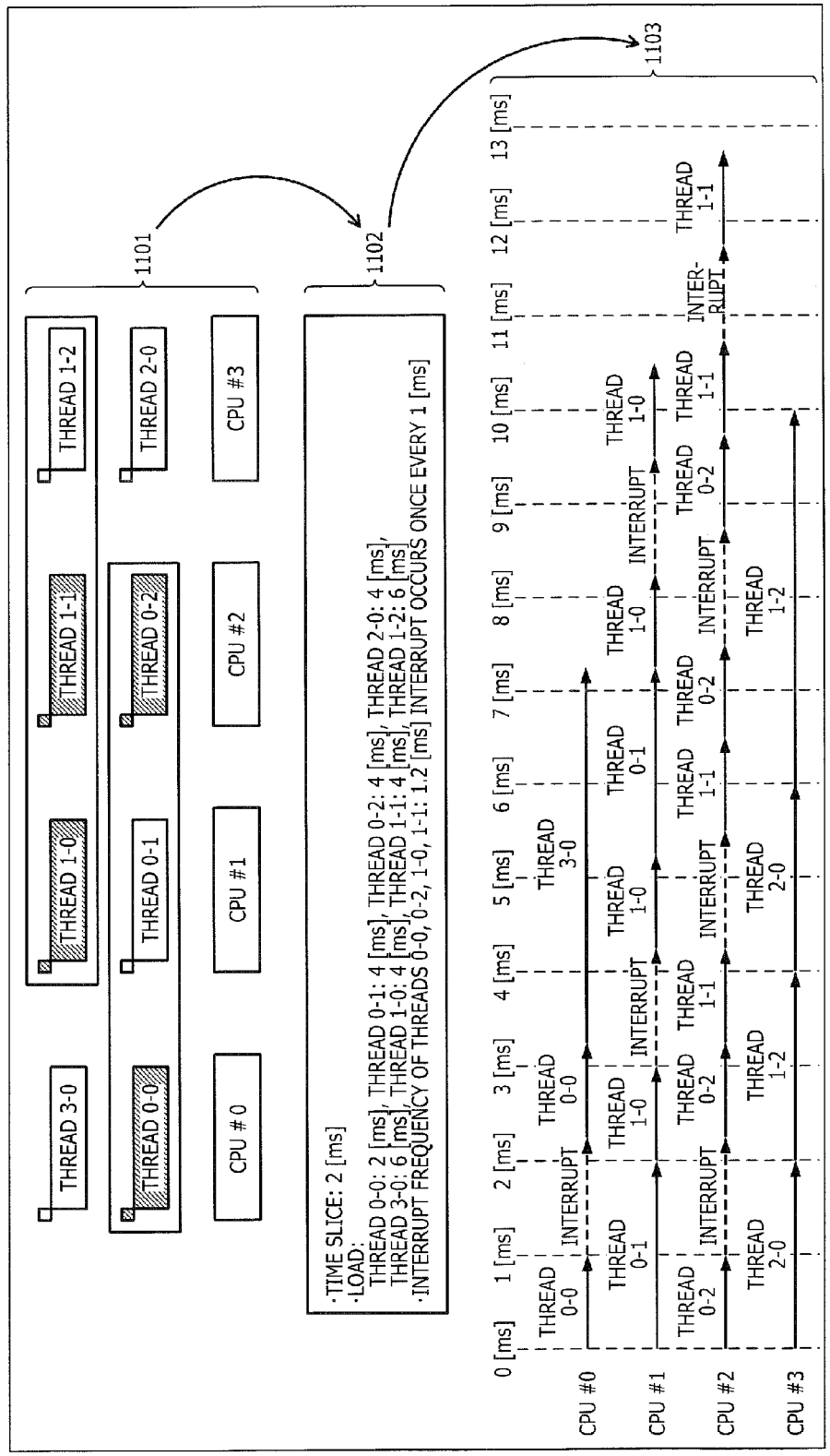
FIG. 11 is an explanatory view of an example of execution results according to the load priority scheduling method.
Figure 12:
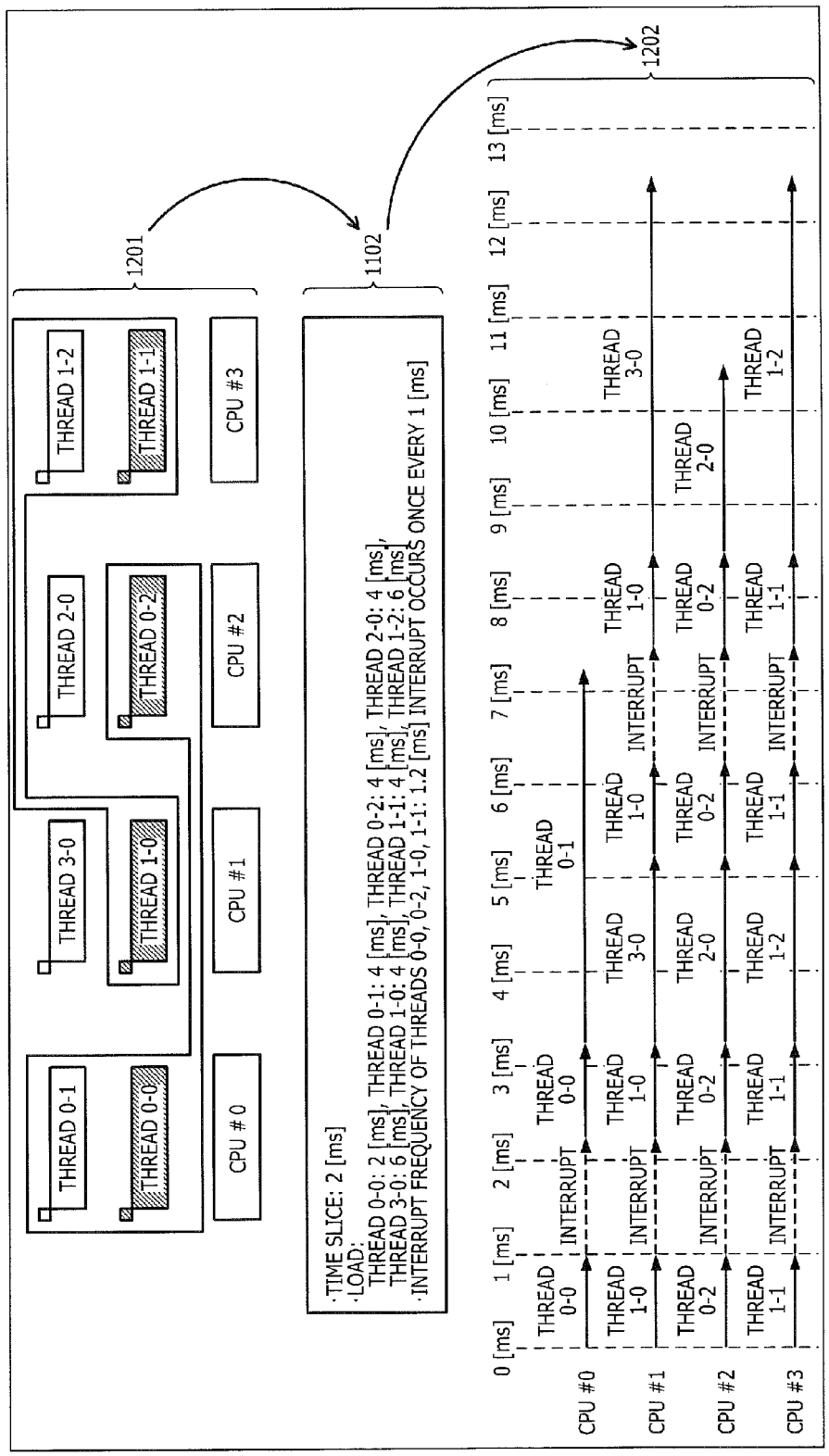
FIG. 12 is an explanatory view of an example of execution results according to the interrupt equalization priority scheduling method.
Figure 13:
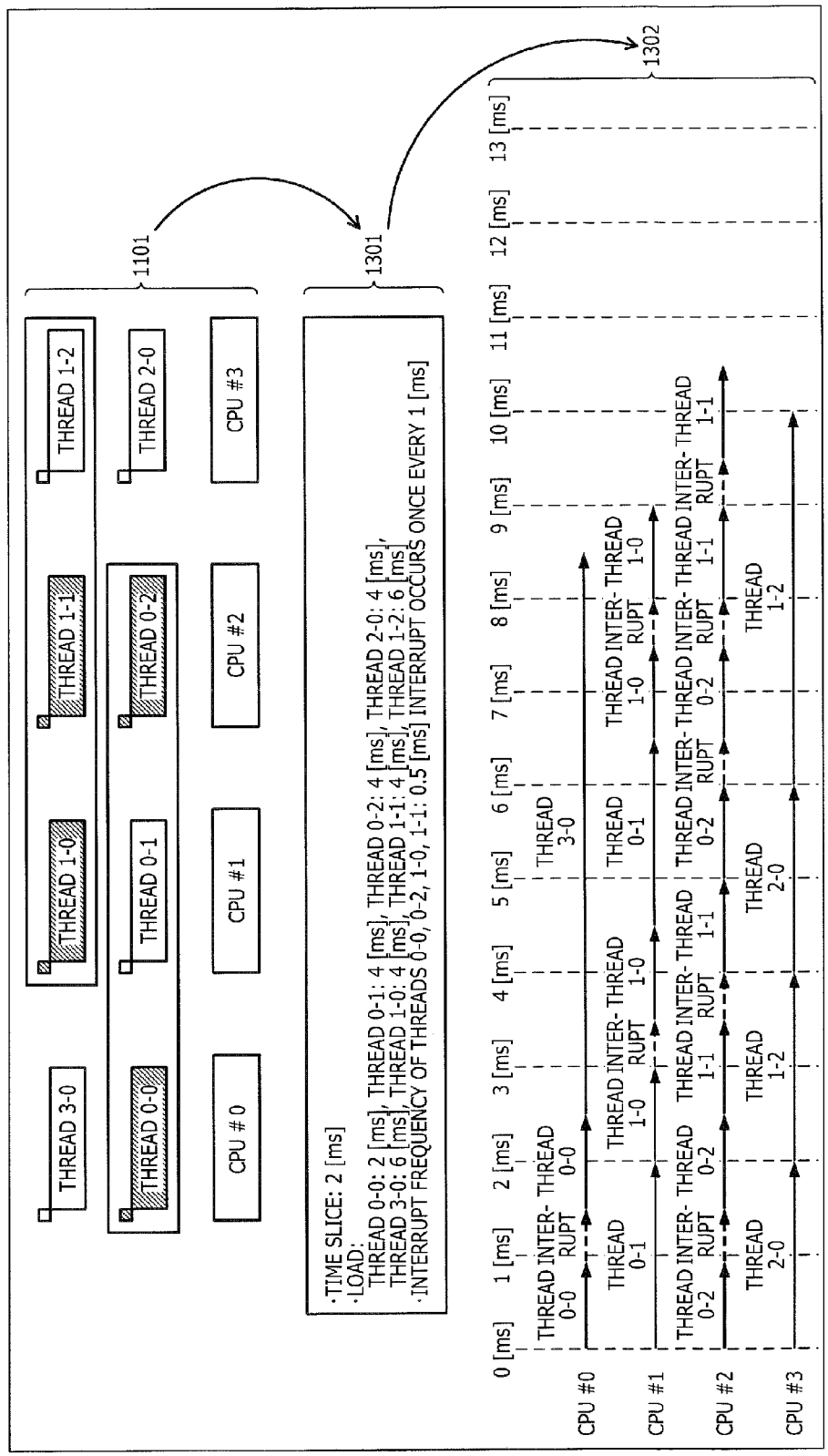
FIG. 13 is an explanatory view of another example of the execution results according to the load priority scheduling method.
Figure 14:
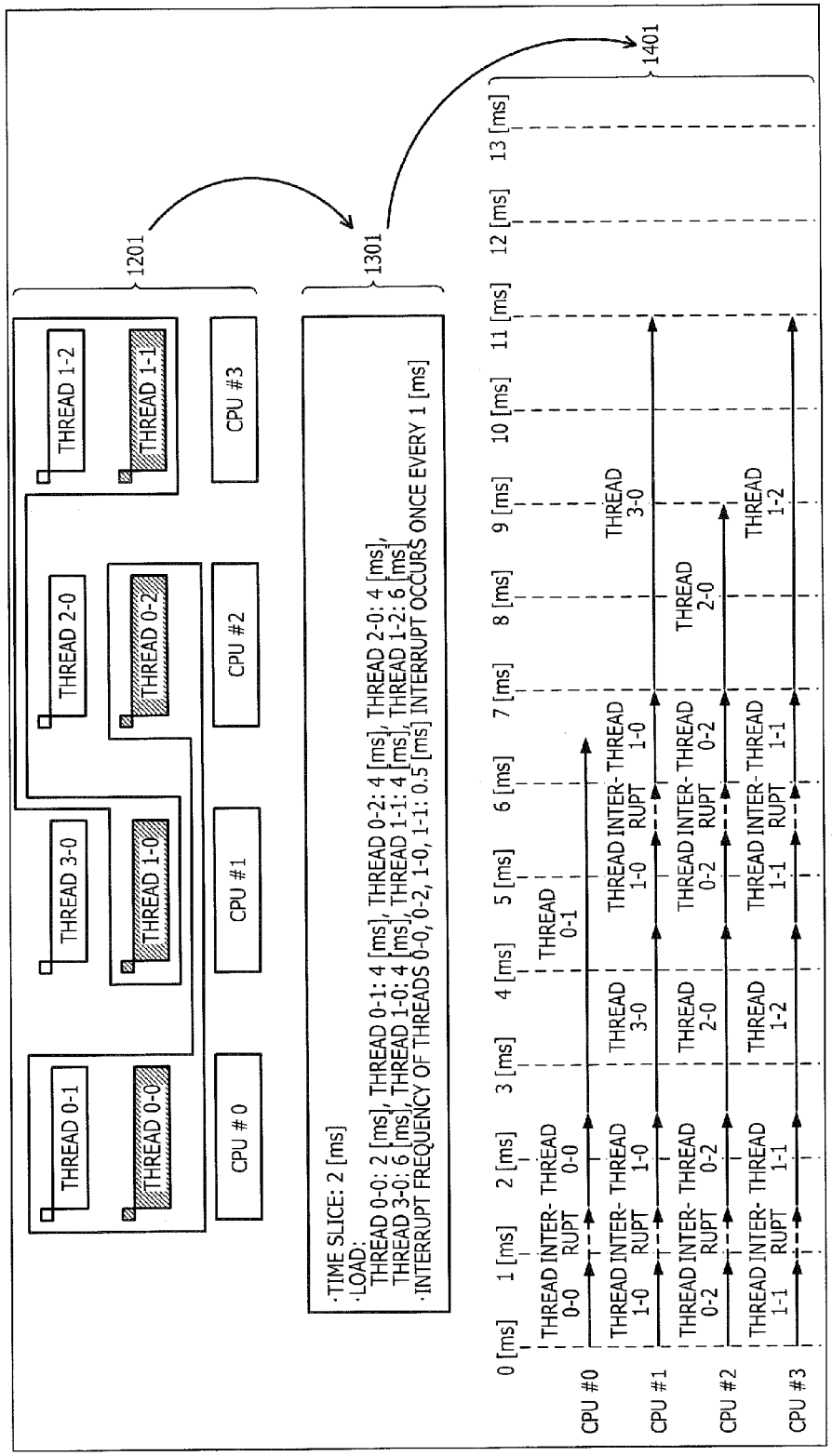
FIG. 14 is an explanatory view of another example of the execution results according to the interrupt equalization priority scheduling method.

FIGS. 11 and 12 assume that interrupt processing whose processing time is 1.2 [ms] occurs once per 1 [ms] in threads subjected to the interrupt at a high frequency. FIGS. 13 and 14 assume that interrupt processing whose processing time is 0.5 [ms] occurs once per 1 [ms] in threads subjected to the interrupt at a high frequency.

FIG. 11 is an explanatory view of an example of the execution results according to the load priority scheduling method. FIG. 11 depicts a thread assignment state 1101 indicative of the assignment state in the load priority scheduling method, processing information 1102 indicative of the thread processing state, and a time chart 1103 indicative of the execution results. The thread assignment state indicated by the thread assignment state 1101 is equivalent to the state in FIG. 1 and therefore, will not again be described. The values indicated by the processing information 1102 have been described above and the description thereof will be omitted.

In the time chart 1103, the CPU #0 processes the threads 0-0 and 3-0 in 7.2 [ms]. Similarly, the CPU #1 processes the threads 0-1 and 1-0 in 10.4 [ms], the CPU #2 processes the threads 0-2 and 1-1 in 12.8 [ms], and the CPU #3 processes the threads 2-0 and 1-2 in 10 [ms]. Hence, in case of executing the load priority scheduling method, the multi-core processor system 100 can process in 12.8 [ms], the loads of the threads indicated in the processing information 1102.

FIG. 12 is an explanatory view of an example of the execution results according to the interrupt equalization priority scheduling method. FIG. 12 depicts a thread assignment state 1201 indicative of the assignment state of the interrupt equalization priority scheduling method, the processing information 1102, and a time chart 1202 indicative of the execution results. The thread assignment state 1201 depicted in FIG. 12 is equivalent to the state of FIG. 2 and therefore, the description thereof will be omitted.

In the time chart 1202, the CPU #0 processes the threads 0-0 and 0-1 in 7.2 [ms]. Similarly, the CPU #1 processes the threads 1-0 and 3-0 in 12.4 [ms], the CPU #2 processes the threads 0-2 and 2-0 in 10.4 [ms], and the CPU #3 processes the threads 1-1 and 1-2 in 12.4 [ms]. Hence, in case of executing the interrupt equalizing priority scheduling method, the multi-core processor system 100 can process in 12.4 [ms], the loads of the threads indicated in the processing information 1102.

In this manner, if the multi-core processor system 100 executes the interrupt equalization priority scheduling method, the execution time for the state indicated by the processing information 1102 is 12.4 [ms], achieving more rapid processing than the case of executing the load priority scheduling method.

FIG. 13 is an explanatory view of another example of the execution results according to the load priority scheduling method. FIG. 13 depicts a thread assignment state 1101 indicative of the assignment state in the load priority scheduling method, processing information 1301 indicative of the thread processing state, and a time chart 1302 indicative of the execution results. The values indicated by the processing information 1301 have been described above and the description thereof will be omitted.

In the time chart 1302, the CPU #0 processes the threads 0-0 and 3-0 in 805 [ms]. Similarly, the CPU #1 processes the threads 0-1 and 1-0 in 9 [ms], the CPU #2 processes the threads 0-2 and 1-1 in 10.5 [ms], and the CPU #3 processes the threads 2-0 and 1-2 in 10 [ms]. Hence, in case of executing the load priority scheduling method, the multi-core processor system 100 can process in 10.5 [ms], the loads of the threads indicated in the processing information 1301.

FIG. 14 is an explanatory view of another example of the execution results according to the interrupt equalization priority scheduling method. FIG. 14 depicts a thread assignment state 1201 indicative of the assignment state of the interrupt equalization priority scheduling method, the processing information 1301, and a time chart 1401 indicative of the execution results.

In the time chart 1401, the CPU #0 processes the threads 0-0 and 0-1 in 6.5 [ms]. Similarly, the CPU #1 processes the threads 1-0 and 3-0 in 11 [ms], the CPU #2 processes the threads 0-2 and 2-0 in 9 [ms], and the CPU #3 processes the threads 1-1 and 1-2 in 11 [ms]. Hence, in case of executing the interrupt equalizing priority scheduling method, the multi-core processor system 100 can process in 11 [ms], the loads of the threads indicated in the processing information 1301.

Accordingly, if the multi-core processor system 100 executes the load priority scheduling method, the execution time for the loads indicated by the processing information 1301 is 10.5 [ms], achieving more rapid processing than the case of executing the interrupt equalization priority scheduling method.

Figure 15:
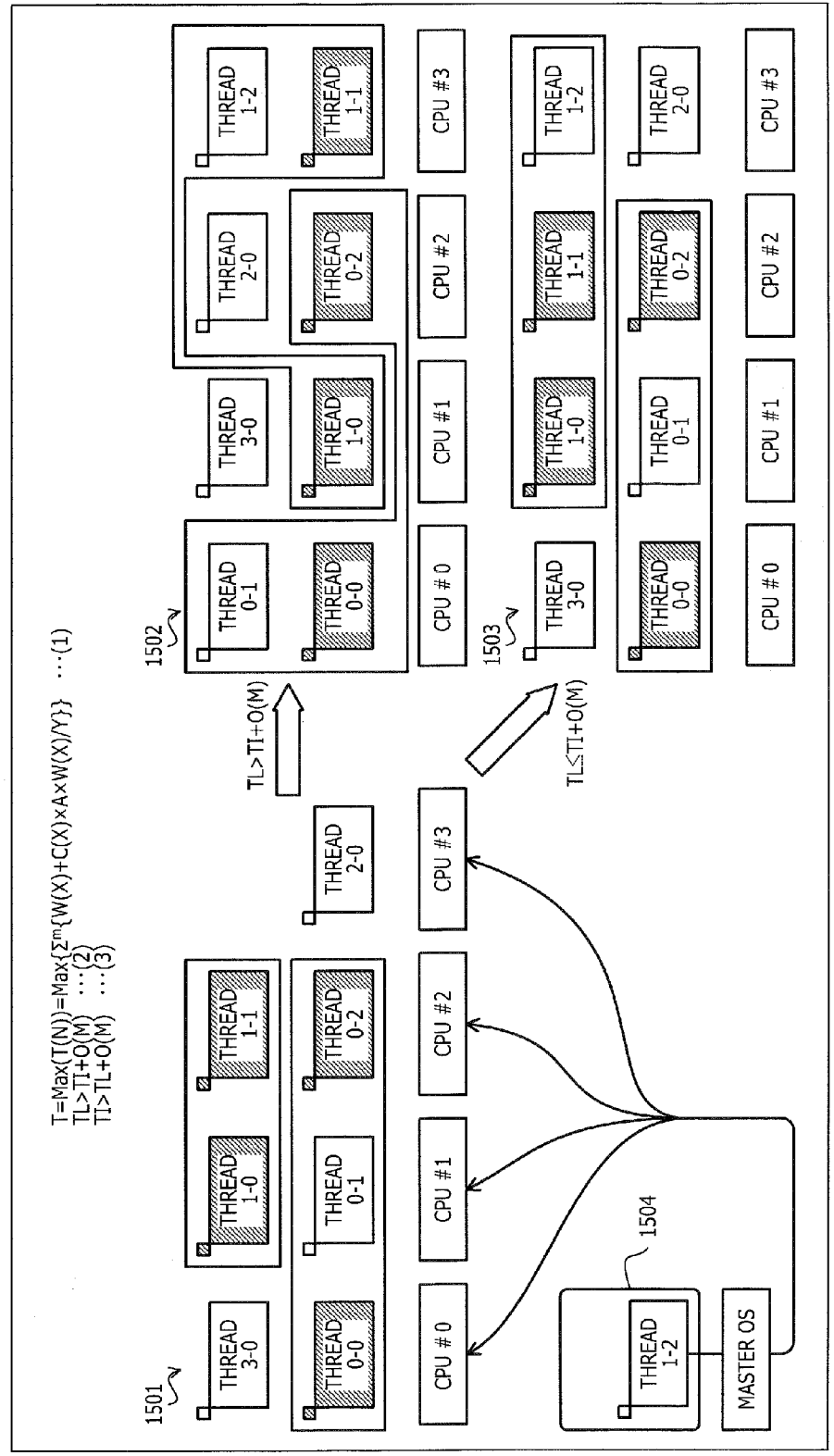
FIG. 15 is an explanatory view of an example of a determination to switch scheduling methods.

In this manner, which method achieves more rapid processing among the load priority scheduling method and the interrupt equalization priority scheduling method depends on the thread load, the interrupt frequency, and the interrupt processing time. Thus, the scheduling method selecting unit 424 calculates respective execution times predicted when operating according to the load priority scheduling method and the interrupt equalization priority scheduling method, respectively, and selects the scheduling method by which the execution time becomes shorter. With reference to FIG. 15, a determination to switch the scheduling method will be described using an example.

FIG. 15 is an explanatory view of an example of a determination to switch the scheduling method. In FIG. 15, an example is depicted of the determination to switch the scheduling method between the load priority scheduling method and the interrupt equalization priority scheduling method. The scheduling method selecting unit 424 calculates execution time T for the case of the load priority scheduling method or the interrupt equalization priority scheduling method, using Equation (1) below.

$$T = \mathrm{Max}(T(N)) = \mathrm{Max}\{\Sigma m\{W(X) + C(X) \times A \times W(X)/Y\}\} \quad (1)$$

Where, N, T(N), m, and W(X) are a CPU No., time required for thread processing, the number of threads assigned to an N-th CPU, and the load of a thread X, respectively. Where, Y, C(X), and A are a time slice, the interrupt processing count per one time slice of the thread X, and average time required for the interrupt processing, respectively. The first and second terms within Σ of Equation (1) correspond to the load and the interrupt processing time, respectively.

The scheduling method selecting unit 424 uses Equation (1) to calculate execution time TL for the case of the load priority scheduling method and execution time TI for the case of the interrupt equalization priority scheduling method. If Expression (2), as a scheduling determining expression, is satisfied during the selection of the load priority scheduling method, the scheduling method selecting unit 424 switches the scheduling method to the interrupt equalization priority scheduling method.

$$TL > TI + O(M) \quad (2)$$

Where, M and O(M) are the total number of threads running in the multi-core processor system 100 and the time required for rescheduling when the total number of threads is M, respectively. If Equation (3), as a scheduling determining equation, is satisfied during the selection of the interrupt equalization priority scheduling method, the scheduling method selecting unit 424 switches the scheduling method to the load priority scheduling method.

$$TI > TL + O(M) \quad (3)$$

Assume, for example, that the multi-core processor system 100 operates according to a load priority scheduling method designated at reference numeral 1501. At this time, the assignment state of threads conforms to the load distribution scheduling and conforms as the processing state to the processing information 1102. In response to an activation request, the thread 1-2 is stored in a wait queue 1504. The wait queue 1504 is a queue for storing threads not yet assigned to CPUs regardless of reception of the activation request.

When the thread 1-2 is assigned to one of the CPUs #0 to #3, the scheduling method selecting unit 424 calculates execution times TL#0 to TL#3 in the CPUs #0 to #3, respectively, from Equation (1) as follows.

$$TL\#0 = \Sigma m\{W(X) + C(X) \times A \times W(X)/Y\} \Leftrightarrow TL\#0 = (2 + 1 \times 1.2 \times 2/2) + (6 + 0 \times 1.2 \times 6/2) \Leftrightarrow TL\#0 = 3.2 + 6 = 9.2 \text{ [ms]}$$

Similarly, the scheduling method selecting unit 424 calculates TL#1 to TL#3 from Equation (1) to obtain TL#1=10.4 [ms], TL#2=12.8 [ms], and TL#3=10.0 [ms]. The scheduling method selecting unit 424 then calculates the execution time TL=Max(9.2, 10.4, 12.8, 10.0)=12.8 according to the load priority scheduling method.

The scheduling method selecting unit 424 decides the thread assignment state to be as depicted in FIG. 12 according to the interrupt equalization priority scheduling method and thereafter, calculates execution times TI#0 to TI#3 in the CPUs #0 to #3, respectively, from Equation (1) as follows.

$$TI\#0 = (2 + 1 \times 1.2 \times 2/2) + (4 + 0 \times 1.2 \times 4/2) = 7.2 \text{ [ms]}$$

Similarly, the scheduling method selecting unit 424 calculates TI#1 to TI#3 from Equation (1) to obtain TI#1=12.4 [ms], TI#2=10.4 [ms], and TI#3=12.4 [ms]. The scheduling method selecting unit 424 then calculates the execution time TI=Max(7.2, 12.4, 10.4, 12.4)=12.8 according to the load priority scheduling method.

After the calculation of TL and TI, the scheduling method selecting unit 424 determines based on Expression (2) whether to switch the scheduling method to the interrupt equalization priority scheduling method or to continue using the load priority scheduling method. Using the result of calculation, the scheduling method selecting unit 424 executes Expression (2) as follows.

$$12.8 > 12.4 + O(M)$$

Therefore, if O(M) is less than 0.4 [ms], the scheduling method selecting unit 424 switches to a state 1502 that is the state according to the interrupt equalization priority scheduling method. If O(M) is not less than 0.4 [ms], the scheduling method selecting unit 424 transitions to a state 1503 that is a state according to the load priority scheduling method. An example of setting O(M) will be given in FIG. 16.

Figure 16:
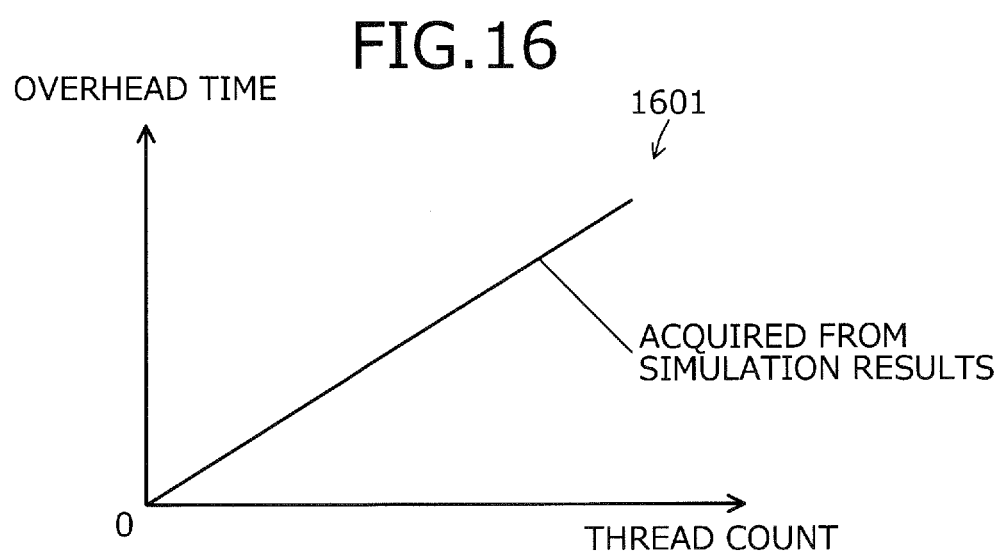
FIG. 16 is an explanatory view of an O(M) setting example.

FIG. 16 is an explanatory view of an O(M) setting example. The cost for rescheduling is a cost needed to re-queue running threads into a ready queue. The cost of queuing the threads depends on the scheduling algorithm and the OS.

As the O(M) setting example, there exist a method of statically setting O(M) for the thread count M and a method of dynamically setting O(M) for the thread count M. First, in the case of static setting, for example, the multi-core processor system 100 sets the time consumed for rescheduling when the thread count M is a fixed value. The fixed value may be for example the best value that can be obtained in the multi-core processor system 100 or a maximum value that is executable by threads in the multi-core processor system 100.

Second, in the case of dynamic setting, the multi-core processor system 100 measures the time needed for queuing when the thread count is varied by a simulator, etc. The multi-core processor system 100 allows the scheduling method selecting unit 424 to keep the measurement results as an overhead function that depends on the thread count.

The measurement results are as represented by a graph 1601. In the graph 1601, the horizontal axis represents the thread count and the vertical axis represents the overhead time. Since the relationship between the thread count and the overhead time is expressed by a linear expression in the graph 1601, the multi-core processor system 100 sets O(M)=B×M for example. B is a value that depends on the OS and the scheduling algorithm.

Using the functions and storage contents described above, the multi-core processor system 100 executes a scheduling method switching process. FIGS. 17 and 18 depict a scheduling method switching procedure and FIG. 19 depicts an example of an assigning procedure according to the interrupt equalization priority scheduling method. The CPU executing the flowchart depicted in FIG. 17 is assumed to be the CPU #0 and the CPU executing the flowchart depicted in FIG. 18 is assumed to be the CPU #1.

FIG. 17 is a flowchart of an example of the scheduling method switching procedure performed by the master OS. The CPU #0 determines whether a new thread is present in the wait queue 1504 of the master scheduler (step S1701). If a new thread is present (step S1701: YES), the CPU #0 calculates the execution time for the load priority scheduling method (step S1702). The CPU #0 then calculates the execution time for the interrupt equalization priority scheduling method (step S1703).

After calculating the two execution times, the CPU #0 selects a scheduling method based on the scheduling method determining expression (step S1704). For example, if the load priority scheduling method is being selected as the current scheduling method, the CPU #0 employs Expression (2) as the scheduling method determining expression. If the interrupt equalization priority scheduling method is being selected, the CPU #0 employs Equation (3) as the scheduling method determining expression.

After the selection of the scheduling method, the CPU #0 determines whether the selected method differs from the currently selected scheduling method (step S1705). If a different method has been selected (step S1705: YES), the CPU #0 performs rescheduling including threads in the wait queue based on the selected scheduling method (step S1706), and proceeds to step S1701. If the same method has been selected (step S1705: NO), the CPU #0 performs scheduling of threads in the wait queue based on the currently selected scheduling method (step S1712), and proceeds to step S1701. The case of activating new threads with no threads under execution means a state where no scheduling method is currently selected. In this case, the CPU #0 performs scheduling by way of the route of step S1705: YES.

If the same method has been selected (step S1705: NO), the CPU #0 proceeds to step S1701. If no new threads are present (step S1701: NO), the CPU #0 determines whether the processing of all threads in the multi-core processor system 100 has been completed (step S1707). If the processing of all threads has been completed (step S1707: YES), the CPU #0 ends the scheduling method switching process.

If the processing of all threads has not been completed (step S1707: NO), the CPU #0 determines whether interrupt processing has occurred in a thread under execution (step S1708). If interrupt processing has occurred (step S1708: YES), the CPU #0 measures the interrupt count and the interrupt processing time (step S1709). After the measurement, the CPU #0 proceeds to step S1701.

If no interrupt processing has occurred (step S1708: NO), the CPU #0 determines whether thread switching has occurred (step S1710). If thread switching has occurred (step S1710: YES), the CPU #0 uses the measured interrupt count and interrupt processing time to update the interrupt count table 403 (step S1711) and thereafter, proceeds to step S1701. If no thread switching has occurred (step S1710: NO), the CPU #0 proceeds to step S1701.

FIG. 18 is a flowchart of an example of a scheduling method switching procedure performed by the slave OS. The CPU #1 determines whether the processing of all threads in the multi-core processor system 100 has been completed (step S1801). If the processing of all threads has been completed (step S1801: YES), the CPU #1 ends the scheduling method switching process.

If the processing of all threads has not been completed (step S1801: NO), the CPU #1 determines whether interrupt processing has occurred in a thread under execution (step S1802). If interrupt processing has occurred (step S1802: YES), the CPU #1 measures the interrupt count and the interrupt processing time (step S1803). After the measurement, the CPU #1 proceeds to step 1801.

If no interrupt processing has occurred (step S1802: NO), the CPU #1 determines whether thread switching has occurred (step S1804). If thread switching has occurred (step S1804: YES), the CPU #1 uses the measured interrupt count and interrupt processing time to update the interrupt count table 403 (step S1805) and thereafter, proceeds to step S1801. If no thread switching has occurred (step S1804: NO), the CPU #1 proceeds to step S1801.

FIG. 19 is a flowchart of an example of an assigning procedure according to the interrupt equalization priority scheduling method. The timing to execute the interrupt equalization priority scheduling method is the time when calculating the execution time for the interrupt equalization priority scheduling method at step 1703. The execution entity to execute the interrupt equalization priority scheduling method is the master scheduler 425 running in the master CPU.

The CPU #0 selects threads having a high interrupt count from the interrupt count table 403 (step S1901). The CPU #0 then assigns the threads having a high interrupt count to the CPUs according to the load priority scheduling method (step S1902). The CPU #0 then selects threads having a low interrupt count (step S1903). After the selection, the CPU #0 selects from among the threads having a low interrupt count, threads belonging to the process having the greatest number of threads (step S1904).

The CPU #0 then determines whether a thread that belongs to the same process as the selected threads and has a high interrupt count is present (step S1905). If a thread having a high interrupt count is present (step S1905: YES), the CPU #0 determines the CPUs to which the selected threads are to be assigned, as being the CPUs to which threads are assigned that belong to the same process as the selected threads and have a high interrupt count (step S1906). Thereafter, the CPU #0 assigns the selected threads to the CPUs (step S1907).

After the assignment to the CPUs or if no thread having a high interrupt count is present (step S1905: NO), the CPU #0 determines whether each thread has been selected from among the threads having a low interrupt count (step S1908). If not (step S1908: NO), the CPU #0 selects threads belonging to the process having the next greatest number of threads (step S1909), and proceeds to step S1905.

If each thread has been selected (step S1908: YES), the CPU #0 assigns unassigned threads to CPUs according to the load priority scheduling method (step S1910), and ends the assigning process according to the interrupt equalization priority scheduling method.

FIG. 20 is an explanatory view of an example of application to a system that uses a computer according to the embodiment. In FIG. 20, a network NW is a network in which servers 2001 and 2002 are communicable with clients 2031 to 2034, the network NW including for example a LAN, a WAN, Internet, a mobile phone network, etc.

The server 2002 is a management server for a server group (servers 2021 to 2025) having a cloud 2020. The client 2031 is a notebook personal computer (PC). The client 2032 is a desktop PC and the client 2033 is a mobile phone. The client 2033 may be the mobile phone in the form of a smartphone or a personal handyphone system (PHS). The client 2034 is a tablet terminal.

The servers 2001 and 2002, the servers 2021 to 2025, and the clients 2031 to 2034 of FIG. 20 act as data processing devices described in the embodiment for example to execute the scheduling method according to this embodiment. For example, the scheduling method is executed with the server 2001 having the function of the master OS 411 described in this embodiment and with the client 2031 having the function of the slave OS 412 described in this embodiment.

According to the data processing system and the scheduling method, as set forth hereinabove, there are included the interrupt controller that counts up the number of times that interrupt processing is executed and the scheduling method selecting unit that selects a scheduling method based on the interrupt count. This enables the data processing system to select a more efficient scheduling method depending on the execution state, which varies according to the interrupt count, whereby the processing speed of the entire system is improved.

The data processing system includes, as the plural scheduling methods, a first scheduling method performing the scheduling based on loads on the plural data processing devices and a second scheduling method performing the scheduling based on the number of times of that the interrupt processing is executed. This enables the data processing system to select any one among the first scheduling method and the second scheduling method to choose a more efficient scheduling method, thereby enhancing the throughput of the entire data processing system.

The data processing system may determine respective execution times when assigning tasks to data processing devices according to the first and the second scheduling methods, respectively, and may choose a scheduling method based on the result of comparison between the execution times. This enables the data processing system to choose a scheduling method having a shorter predicted execution time.

The data processing system may execute the calculation of execution time according to the first or the second scheduling method at the timing when a new task is added. This enables the data processing system to perform the calculation of the execution time when the scheduling method may change, thereby preventing the execution time from being calculated at a meaningless timing. Similarly, the data processing system may calculate the execution time when tasks in the system have been completed. The data processing system may calculate the execution time when activating or completing a task subjected to the interrupt processing at a high frequency. This enables the data processing system to calculate the execution time only when the scheduling method may be more likely change.

The data processing system may calculate the predicted execution time as being a greatest sum of the time consumed for interrupt processing occurring during the execution of the tasks and the load of tasks assigned to a data processing device, among the sums for each of data processing devices. As a result, the data processing system can detect a data processing device having a delayed processing time consequent to frequent interrupt processing.

In the second scheduling method, the data processing system may assign tasks subjected to the interrupt processing at a high frequency to plural data processing devices and assign tasks subjected to the interrupt processing at a low frequency to a data processing device to which tasks are assigned that belong to the same process as the low-frequency tasks. In this manner, by assigning tasks belonging to the same process to a data processing device to which a high-frequency task is assigned, tasks belonging to the other processes become difficult to assign to the data processing device. Accordingly, the other processes are less likely to be affected by the delay in the processing arising from tasks subjected to the interrupt processing at a high frequency.

After the assignment of low-frequency tasks to data processing devices, the data processing system may assign unassigned tasks to the data processing devices such that loads on the data processing devices become even. As a result, the data processing system can assign tasks to data processing devices in such a manner that the interrupt processing on the data processing devices is equalized and loads on the data processing devices are balanced.

The scheduling method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method of assigning a plurality of threads to a plurality of data processing devices that include a first data processing device, the scheduling method comprising:
   assigning to a plurality of second data processing devices, first threads that are among the plurality of threads and subjected to interrupt processing at a first frequency; and
   assigning second threads that are among the plurality of threads and subjected to interrupt processing at a second frequency that is lower than the first frequency, to data processing devices among the data processing devices and to which the first threads are assigned that belong to a process to which the second threads belong.

2. The scheduling method according to claim 1, further comprising
   assigning, after assigning the second threads that are subjected to interrupt processing at the second frequency, unassigned threads that are among the plurality of threads to the data processing devices such that loads on the data processing devices become balanced.

* * * * *